US011390722B2

(12) United States Patent
Rasmussen et al.

(10) Patent No.: US 11,390,722 B2
(45) Date of Patent: Jul. 19, 2022

(54) POLYMERIC SUBSTRATES WITH ATTACHED THIOCARBONYLTHIO-CONTAINING GROUPS

(71) Applicant: 3M INNOVATIVE PROPERTIES COMPANY, St. Paul, MN (US)

(72) Inventors: Jerald K. Rasmussen, Woodville, WI (US); Stephen B. Roscoe, Woodbury, MN (US); Babu N. Gaddam, Woodbury, MN (US); George W. Griesgraber, Eagan, MN (US); Daniel J. O'Neal, St. Paul, MN (US); Eli Narveson, St. Louis Park, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 141 days.

(21) Appl. No.: 15/733,171

(22) PCT Filed: Dec. 14, 2018

(86) PCT No.: PCT/IB2018/060118
§ 371 (c)(1),
(2) Date: Jun. 3, 2020

(87) PCT Pub. No.: WO2019/123176
PCT Pub. Date: Jun. 27, 2019

(65) Prior Publication Data
US 2021/0095088 A1    Apr. 1, 2021

Related U.S. Application Data

(60) Provisional application No. 62/608,176, filed on Dec. 20, 2017.

(51) Int. Cl.
*C08J 7/18* (2006.01)
*C08G 75/26* (2006.01)
*C08J 7/12* (2006.01)

(52) U.S. Cl.
CPC ............... *C08J 7/18* (2013.01); *C08G 75/26* (2013.01); *C08J 7/123* (2013.01); *C08J 2381/00* (2013.01)

(58) Field of Classification Search
CPC .......... C08J 7/18; C08J 7/123; C08J 2381/00; C08G 75/26; C08L 81/00; G02B 1/043
See application file for complete search history.

(56) References Cited

U.S. PATENT DOCUMENTS

| 3,876,738 A | 4/1975 | Marinaccio |
| 3,928,517 A | 12/1975 | Knight |
| 4,330,590 A | 5/1982 | Vesley |
| 4,539,256 A | 9/1985 | Shipman |
| 4,707,265 A | 11/1987 | Barnes, Jr. |
| 4,726,989 A | 2/1988 | Mrozinski |
| 4,867,881 A | 9/1989 | Kinzer |
| 5,120,594 A | 6/1992 | Mrozinski |
| 5,260,360 A | 11/1993 | Mrozinski |
| 5,458,782 A | 10/1995 | Hou |
| 5,962,544 A | 10/1999 | Waller, Jr. |
| 6,056,529 A | 5/2000 | Meyering |
| 6,267,916 B1 | 7/2001 | Meyering |
| 6,413,070 B1 | 7/2002 | Meyering |
| 6,512,081 B1 | 1/2003 | Rizzardo |
| 6,776,940 B2 | 8/2004 | Meyering |
| 7,250,479 B2 | 7/2007 | Le |
| 7,338,692 B2 | 3/2008 | Smith |
| 7,662,986 B2 | 2/2010 | Le |
| 8,544,658 B2 | 10/2013 | Stenzel |
| 9,260,638 B2 | 2/2016 | Krepski |
| 2006/0270867 A1 | 11/2006 | Shih |
| 2007/0154703 A1 | 7/2007 | Waller |
| 2008/0114128 A1* | 5/2008 | Destarac ............... C08F 299/00 525/193 |
| 2008/0268551 A1 | 10/2008 | Bowman |
| 2010/0315588 A1* | 12/2010 | Nunez ..................... A61L 27/52 526/264 |
| 2012/0022180 A1* | 1/2012 | Linhardt ................. A61L 27/52 525/477 |
| 2012/0252091 A1 | 10/2012 | Rasmussen |
| 2015/0203593 A1 | 7/2015 | Shannon |
| 2016/0231208 A1 | 8/2016 | Rasmussen |

FOREIGN PATENT DOCUMENTS

| EP | 0142810 | 5/1985 |
| JP | S47-040913 | 10/1972 |

(Continued)

OTHER PUBLICATIONS

Barner, "Reversible Addition-Fragmentation Chain-Transfer Graft Polymerization of Styrene: Solid Phases for Organic and Peptide Synthesis", Journal of Polymer Science: Part A: Polymer Chemistry, Dec. 2002, Vo. 40, No. 23, pp. 4180-4192.

Barner, "Reversible Addition-Fragmentation Chain Transfer Graft Copolymerization of Styrene and m-Isopropenyl-α, α-dimethylbenzyl Isocyanate from Polypropylene Lanterns: Solid Phases for Scavenging Applications", Journal of Polymer Science: Part A: Polymer Chemistry, Jan. 2006, vol. 44, No. 2, pp. 857-864.

Barner, "Surface Grafting via the Reversible Addition-Fragmentation Chain-Transfer (RAFT) Process: From Polypropylene Beads to Core-Shell Microspheres" Australian Journal of Chemistry, Sep. 2003, vol. 56, No. 10, p. 1091.

(Continued)

Primary Examiner — Jessica M Roswell
(74) Attorney, Agent, or Firm — Jean A. Lown

(57) ABSTRACT

First articles with covalently attached thiocarbonylthio-containing groups are provided. More specifically, the first articles are a functionalized substrate that contains a solid polymeric substrate with a plurality of thiocarbonylthio-containing groups covalently attached directly to carbon atoms in a polymeric backbone of the solid polymeric substrate. Methods of making the first articles with covalently attached thiocarbonylthio-containing groups are provided. Additionally, second articles and methods of using the first articles to generate second articles with covalently attached polymeric chains are provided.

16 Claims, No Drawings

(56) References Cited

FOREIGN PATENT DOCUMENTS

| WO | WO 2010-147864 | 12/2010 |
|---|---|---|
| WO | WO 2010-147874 | 12/2010 |
| WO | WO 2013-184366 | 12/2013 |
| WO | WO 2014-204763 | 12/2014 |
| WO | WO 2015-050767 | 4/2015 |
| WO | WO 2018-048696 | 3/2018 |
| WO | WO 2018-048698 | 3/2018 |
| WO | WO 2019-070889 | 4/2019 |
| WO | WO 2019-123177 | 6/2019 |

OTHER PUBLICATIONS

Barsbay, "RAFT-Mediated Polymerization and Grafting of Sodium 4-Styrenesulfonate from Cellulose Initiated via Y-Radiation", Polymer, Feb. 2009, vol. 50, No. 4, pp. 973-982.

Barsbay, "Verification of Controlled Grafting of Styrene from Cellulose via Radiation-Induced RAFT Polymerization", Macromolecules, Sep. 2007, vol. 40, pp. 7140-7147.

Chong, "Thiocarbonylthio, Compounds [SC(Ph)S-R] in Free Radical, Polymenzation with Reversible, Addition-Fragmentation Chain Transfer, (RAFT Polymerization). Role of the Free-Radical Leaving Group (R)", Macromolecules, Apr. 2003, vol. 36, No. 7, pp. 2256-2272.

Davies, "The Separation of Airborne Dust and Particles", Proceedings of the Institution of Mechanical Engineers, Jun. 1953, vol. 167, No. 1B, pp. 185-213.

Harvison, "End Group Reactions of RAFT-Prepared (Co)Polymers", Australian Journal of Chemistry, 2011, vol. 64, No. 8, pp. 992-1006.

Kiani, "Raft Mediated Surface Grafting of t-Butyl Acrylate onto an Ethylene-Propylene Copolymer Initiated by Gamma Radiation", Journal of Polymer Science—Part A—Polymer Chemistry, Mar. 2007, vol. 45, No. 6, pp. 1074-1083.

Luo, "Surface-Initiated Photopolymerization of Poly(ethylene glycol) Methyl Ether Methacrylate on a Diethyldithiocarbamate-Mediated Polymer Substrate", Macromolecules, Apr. 2002, vol. 35, No. 7, pp. 2487-2693.

Moad, "Living Radical Polymerization by the RAFT Process", Australian Journal of Chemistry, 2005, vol. 58, No. 6, pp. 379-410.

Otsu, "Iniferter Concept and Living Radical Polymerization", Journal of Polymer Science—Part A—Polymer Chemistry, Jun. 2000, vol. 38, No. 12, pp. 2121-2136.

Wente, "Manufacture of Superfine Organic Fibers" Naval Research Laboratories Report No. 4364, May 1954, 21 pages.

Wente, "Superfine Thermoplastic Fibers" Industrial & Engineering Chemistry, Aug. 1956, vol. 48, No. 8, pp. 1342-1346.

Williamson, "Regioselective C-H Xanthylation as a Platform for Polyolefin Functionalization", Angewandte Chemie, May 2018, vol. 57, No. 21, pp. 6261-6265.

Xu, "Functionalization of Nylon Membranes via Surface-Initiated Atom-Transfer Radical Polymerization", Langmuir, Oct. Jul. 2007, vol. 23, No. 16, pp. 8585-8592.

Yu, "Thermo- and pH-Responsive Polypropylene Microporous Membrane Prepared by the Photoinduced RAFT-Mediated Graft Copolymerization" Journal of Membrane Science, Nov. 2009, vol. 343, No. 1-2, pp. 82-89.

Zhou_ "Development of a Novel RAFT-UV Grafting Technique to Modify Polypropylene Membrane used for NOM Removal", Separation and Purification Technology, Feb. 2010, vol. 71, No. 2 pp. 233-240.

International Search Report for PCT International Application No. PCT/IB2018/060118, dated Apr. 25, 2019, 5 pages.

International Search Report for PCT International Application No. PCT/IB2018/060120, dated May 7, 2019, 5 pages.

* cited by examiner

POLYMERIC SUBSTRATES WITH ATTACHED THIOCARBONYLTHIO-CONTAINING GROUPS

CROSS REFERENCE TO RELATED APPLICATIONS

This application is a national stage filing under 35 U.S.C. 371 of PCT/IB2018/060118, filed Dec. 14, 2018, which claims the benefit of U.S. Provisional Patent Application No. 62/608,176, filed Dec. 20, 2017, the disclosure of which is incorporated by reference herein its/their entirety.

BACKGROUND

Controlled radical initiators have been used in the synthesis of various polymeric materials. Some of these controlled radical initiators can be used for reversible addition-fragmentation chain transfer (RAFT) polymerization reactions. RAFT polymerization methods can be used, for example, to more easily control the molecular weight of the resulting polymeric materials.

Various methods have been used for attaching polymeric materials to a substrate. For example, Patent Application WO 2015/050767 (Rasmussen et al.), WO 2013/184366 (Bothof et al.), WO 2015/050767 (Rasmussen et al.), WO 2014/204763 (Rasmussen et al.) describe ligand-functionalized substrates that can be used for binding various biomaterials.

SUMMARY

First articles containing a solid polymeric substrate with covalently attached thiocarbonylthio-containing groups, second articles containing a solid polymeric substrate with covalently attached polymeric chains, and methods of making both the first articles and second articles are provided. More particularly, the first article is a functionalized substrate having a solid polymeric substrate with covalently attached thiocarbonylthio-containing groups. These first articles can be used to form second articles with covalently attached polymeric chains. The thiocarbonylthio-containing groups on the functionalized substrate can function as iniferters for polymerization reactions. Advantageously, the nature of the solid polymeric substrate included in the articles can be hydrophobic or hydrophilic and the molecular weight of the covalently attached polymeric chains formed using the functionalized substrates can be controlled.

In a first aspect, a method of making a first article comprising a functionalized substrate is provided. The method includes providing a solid polymeric substrate and generating free radicals on a surface of the solid polymeric substrate to form a treated substrate. The method further includes reacting the free radicals of the treated substrate with a fluid comprising a thiocarbonylthio-containing compound to covalently bond a plurality of thiocarbonylthio-containing groups directly to carbon atoms in a polymeric backbone of the solid polymeric substrate and forming the functionalized substrate.

In a second aspect, a first article comprising a functionalized substrate is provided. The functionalized substrate comprises a reaction product of a reaction mixture containing a) a treated substrate comprising a solid polymeric substrate having free radicals and b) a fluid comprising a thiocarbonylthio-containing compound. The functionalized substrate has a plurality of thiocarbonylthio-containing groups directly and covalently attached to carbon atoms in a polymeric backbone of the solid polymeric substrate.

In a third aspect, a method of making a second article having a solid polymeric substrate with attached polymeric chains is provided. The method includes providing a solid polymeric substrate and generating free radicals on a surface of the solid polymeric substrate to form a treated substrate. The method further includes reacting the free radicals of the treated substrate with a fluid comprising a thiocarbonylthio-containing compound to covalently bond a plurality of thiocarbonylthio-containing groups directly to the solid polymeric substrate and forming a functionalized substrate. The method further includes preparing a reaction mixture by contacting the functionalized substrate with a monomer composition comprising radically polymerizable monomers. The method still further includes exposing the reaction mixture to heat or actinic radiation and forming polymeric chains directly and covalently attached to carbon atoms in a polymeric backbone of the solid polymeric substrate, the polymeric chains being a polymerized product of the radically polymerizable monomers.

In a fourth aspect, an article having attached polymeric chains is provided. The article contains a solid polymeric substrate and polymeric chains directly and covalently attached to carbon atoms in a polymeric backbone of the solid polymeric substrate. The polymeric chains comprise a polymerized product of a radically polymerizable monomer composition, wherein at least some of the polymeric chains are terminated by a thiol or a thiocarbonylthio-containing group.

DETAILED DESCRIPTION

First articles with covalently attached thiocarbonylthio-containing groups are provided. More specifically, the first articles are a functionalized substrate that contains a solid polymeric substrate with a plurality of thiocarbonylthio-containing groups covalently attached directly to carbon atoms in a polymeric backbone of the solid polymeric substrate. Methods of making the first articles with covalently attached thiocarbonylthio-containing groups are provided. Additionally, second articles and methods of using the first articles to generate second articles with covalently attached polymeric chains are provided.

As used herein, the terms "a", "an", "the", and "at least one" are used interchangeably.

The term "and/or" means either or both. For example, "A and/or B" means only A, only B, or both A and B.

The term "alkyl" refers to a monovalent group that is a radical of an alkane. The alkyl group can have 1 to 32 carbon atoms, 1 to 20 carbon atoms, 1 to 12 carbon atoms, 1 to 10 carbon atoms, 1 to 6 carbon atoms, or 1 to 4 carbon atoms. The alkyl can be linear, branched, cyclic, or a combination thereof. A linear alkyl has at least one carbon atom while a cyclic or branched alkyl has at least 3 carbon atoms. In some embodiments, if there are greater than 12 carbon atoms, the alkyl is branched.

The term "alkylene" refers to a divalent group that is a radical of an alkane. The alkylene group can have 1 to 32 carbon atoms, 1 to 20 carbon atoms, 1 to 12 carbon atoms, 1 to 10 carbon atoms, 1 to 6 carbon atoms, or 1 to 4 carbon atoms. The alkyl can be linear, branched, cyclic, or a combination thereof. A linear alkylene has at least one carbon atom while a cyclic or branched alkyl has at least 3 carbon atoms. In some embodiments, if there are greater than 12 carbon atoms, the alkylene is branched.

The term "alkoxy" refers to a monovalent group of formula —OR$^a$ where R$^a$ is an alkyl as defined above.

The term "alkenyl" refers to a monovalent group that is a radical of an alkene, which is a hydrocarbon compound having at least one carbon-carbon double bond. In some embodiments, the alkenyl has a single carbon-carbon double bond. In some more specific embodiments, the alkenyl has an ethylenically unsaturated group (the carbon-carbon double bond is between the last two carbon atoms in a chain). The alkenyl can be linear, branched, or cyclic. The alkenyl often has at least 2, at least 3, at least 4, or at least 5 carbon atoms and can have up to 32 carbon atoms, up to 24 carbon atoms, up to 20 carbon atoms, up to 12 carbon atoms, up to 10 carbon atoms, or up to 5 carbon atoms.

The term "alkenyloxy" refers to a monovalent group of formula —OR$^b$ where R$^b$ is an alkenyl as defined above.

The term "aryl" refers to a monovalent group that is a radical of an aromatic carbocyclic compound. The aryl group has at least one aromatic carbocyclic ring and can have 1 to 3 optional rings that are connected to or fused to the aromatic carbocyclic ring. The additional rings can be aromatic, aliphatic, or a combination thereof. The aryl group usually has 5 to 20 carbon atoms or 6 to 10 carbon atoms.

The term "arylene" refers to a divalent group that is a radical of an aromatic carbocyclic compound. The arylene group has at least one aromatic carbocyclic ring and can have 1 to 3 optional rings that are connected to or fused to the aromatic carbocyclic ring. The additional rings can be aromatic, aliphatic, or a combination thereof. The arylene group usually has 5 to 20 carbon atoms or 6 to 10 carbon atoms.

The term "aralkyl" refers to an alkyl group substituted with at least one aryl group. That is, the aralkyl group is of formula —R$^d$—Ar where R$^d$ is an alkylene and Ar is an aryl. The aralkyl group contains 6 to 40 carbon atoms. The aralkyl group often contains an alkylene group having 1 to 20 carbon atoms or 1 to 10 carbon atoms and an aryl group having 5 to 20 carbon atoms or 6 to 10 carbon atoms.

The term "aralkyloxy" refers to a monovalent group that is of formula —O—R$^d$—Ar with R$^d$ and Ar being the same as defined above for aralkyl.

The term "alkaryl" refers to an aryl group substituted with at least one alkyl group. That is, the alkaryl group is of formula —Ar$^1$—R$^e$ where Ar$^1$ is an arylene and R$^e$ is an alkyl. The alkaryl group contains 6 to 40 carbon atoms. The alkaryl group often contain an arylene group having 5 to 20 carbon atoms or 6 to 10 carbon atoms and an alkyl group having 1 to 20 carbon atoms or 1 to 10 carbon atoms.

The term "aryloxy" refers to a monovalent group of formula —O—Ar where Ar is an aryl.

The term "fluid" refers to a liquid and/or gas.

The term "functionalized substrate" refers to a solid polymeric substrate having a plurality of covalently attached thiocarbonylthio-containing groups.

The term "iniferter" is used to refer to a functional group that can, under appropriate conditions, function as a free radical initiator, as a chain transfer agent, or as a free radical chain terminator.

The terms "polymer" and "polymeric material" are used interchangeably and refer to materials formed by reacting one or more monomers. The terms include homopolymers, copolymers, terpolymers, or the like. Likewise, the terms "polymerize" and "polymerizing" refer to the process of making a polymeric material that can be a homopolymer, copolymer, terpolymer, or the like.

The term "thiocarbonylthio" refers to a divalent group —S—C(=S)—.

The term "treated substrate" refers to a solid polymeric substrate having a plurality of free radicals available for reaction with another compound such as a thiocarbonylthio-containing compound.

The terms "in a range of" or "in the range of" are used interchangeably to refer to all values within the range plus the endpoints of the range.

A first article that contains a functionalized substrate and a method of making the first article are provided. The terms "first article" and "functionalized substrate" are used interchangeably. The method includes providing a solid polymeric substrate and generating free radicals on a surface of the solid polymeric substrate to form a treated substrate. The method further includes reacting the free radicals of the treated substrate with a fluid comprising a thiocarbonylthio-containing compound to covalently bond a plurality of thiocarbonylthio-containing groups directly to carbon atoms in a polymeric backbone of the solid polymeric substrate and forming the functionalized substrate. The covalently attached thiocarbonylthio-containing groups can serve as iniferters in polymerization reactions. The functionalized substrates can be used as polymeric chain transfer agents or as polymeric initiators. As such, the functionalized substrate can be used to graft polymeric chains to the solid polymeric substrate thereby forming a second article.

The articles have a solid polymeric substrate. That is, the polymeric substrate is not a liquid and is not dissolved in a solution. The terms "solid polymeric substrate", "polymeric substrate", and "substrate" are used interchangeably. The polymeric substrate can be flexible or rigid, porous or non-porous, and can be thermoplastic or thermoset materials. The polymeric substrate can have any desired size, shape, and form. In many examples, the polymeric substrate is in the form of particles, fibers, films, non-woven webs, woven webs, membranes, sponges, or sheets. In some examples, the polymeric substrate is a porous substrate such as a porous membrane or a porous non-woven web.

To prepare large articles or many articles and for ease of manufacturing, the polymeric substrate can be in the form of a roll such as a roll of film, non-woven web, woven web, membrane, sponge, or sheet. This allows the use of roll-to-roll processing to prepare the articles.

Any polymeric material can be used to form the substrates. In some embodiments, the polymeric material is a thermoplastic. Suitable thermoplastics include, but are not limited to, polyolefins, poly(isoprenes), poly(butadienes), fluorinated polymers, chlorinated polymers, polyamides, polyimides, polyethers, poly(ether sulfones), poly(sulfones), poly(vinyl acetates) and copolymers thereof such as poly(ethylene)-co-poly(vinyl acetate), polyesters such as poly(lactic acid), poly(vinyl alcohol) and copolymers thereof such as poly(ethylene)-co-poly(vinyl alcohol), poly(vinyl esters), poly(vinyl ethers), poly(carbonates), polyurethanes, poly((meth)acrylates) and copolymers thereof, and combinations thereof.

Suitable polyolefins for the substrate include poly(ethylene), poly(propylene), poly(1-butene), copolymers of ethylene and propylene, alpha olefin copolymers (such as copolymers of ethylene or propylene with 1-butene, 1-hexene, 1-octene, and 1-decene), poly(ethylene-co-1-butene), poly(ethylene-co-1-butene-co-1-hexene), poly(butadiene) and copolymers thereof, and combinations thereof.

Suitable fluorinated polymers for the substrate include poly(vinyl fluoride), poly(vinylidene fluoride), copolymers of vinylidene fluoride (such as poly(vinylidene fluoride-cohexafluoropropylene)), copolymers of chlorotrifluoroethylene (such as poly(ethylene-co-chlorotrifluoroethylene)), and combinations thereof.

Suitable polyamides for the substrate include various nylon compositions such as, for example, poly(iminoadipolyliminohexamethylene), poly(iminoadipolyliminodecamethylene), polycaprolactam, and combinations thereof. Suitable polyimides include poly(pyromellitimide), and combinations thereof.

Suitable poly(ether sulfones) for the substrate include poly(diphenylether sulfone), poly(diphenylsulfone-co-diphenylene oxide sulfone), and combinations thereof.

Suitable copolymers of vinyl acetate for the substrate include copolymers of ethylene and vinyl acetate as well as terpolymers of vinyl acetate, vinyl alcohol, and ethylene.

Thiocarbonylthio-containing groups are grafted to the surface of the polymeric substrate to form a functionalized substrate, which is the first article. The polymeric substrate itself is typically free of thiocarbonylthio-containing groups. That is, the polymeric substrate does not include a polymeric material having thiocarbonylthio-containing groups (e.g., a (meth)acrylate polymer having pendant thiocarbonylthio-containing groups) and/or does not include a coating layer that includes a polymeric material having thiocarbonylthio-containing groups. Alternatively, additional thiocarbonyl-containing groups can be grafted to a polymeric substrate or to a coating layer that contains thiocarbonylthio-containing groups. Grafting can substantially increase the density of the thiocarbonylthio-containing groups on the surface of the polymeric substrate.

If the polymeric substrate is porous, the pores can have any desired average size. In some embodiments, the pores are macroporous, mesoporous, microporous, or a mixture thereof. As used herein, the term "macroporous" refers to a material having pores with diameters greater than 50 nanometers, the term "mesoporous" refers a material having pores with diameters in a range of 2 nanometers to 50 nanometers, and "microporous" refers to a material having pores with diameters less than 2 nanometers.

If the second articles will be used for separating biomaterials, the polymeric substrate is often a porous membrane having an average pore size (average longest diameter of the pore) that is often greater than 0.1 micrometer to minimize size exclusion separations, minimize diffusion constraints, and maximize surface area and separation. Generally, the average pore size can be in the range of 0.1 to 10 micrometers. For example, the average pore size is at least 0.2 micrometers, at least 0.4 micrometers, at least 0.6 micrometers, at least 0.8 micrometers and up to 8 micrometers, up to 6 micrometers, up to 4 micrometers, or up to 2 micrometers.

In some applications, a preferred porous polymeric substrate is a macroporous membrane such as a thermally induced phase separation (TIPS) membrane. TIPS membranes are often prepared by forming a solution of a thermoplastic material and a second material above the melting point of the thermoplastic material. Upon cooling, the thermoplastic material crystallizes and phase separates from the second material. The crystallized material is often stretched. The second material is optionally removed either before or after stretching. Macroporous membranes are further described in U.S. Pat. No. 4,539,256 (Shipman), U.S. Pat. No. 4,726,989 (Mrozinski), U.S. Pat. No. 4,867,881 (Kinzer), U.S. Pat. No. 5,120,594 (Mrozinski), U.S. Pat. No. 5,260,360 (Mrozinski), and U.S. Pat. No. 5,962,544 (Waller, Jr.). Some exemplary TIPS membranes include poly(vinylidene fluoride) (PVDF), polyolefins such as poly(ethylene) or poly(propylene), vinyl-containing polymers or copolymers such as ethylene-vinyl alcohol copolymers and butadiene-containing polymers or copolymers, and (meth) acrylate-containing polymers or copolymers. TIPS membranes including PVDF are further described in U.S. Pat. No. 7,338,692 (Smith et al.).

In some embodiments, the porous substrate can include a nylon macroporous film or sheet (for example, a macroporous membrane), such as those described in U.S. Pat. No. 6,056,529 (Meyering et al.), U.S. Pat. No. 6,267,916 (Meyering et al.), U.S. Pat. No. 6,413,070 (Meyering et al.), U.S. Pat. No. 6,776,940 (Meyering et al.), U.S. Pat. No. 3,876,738 (Marinaccio et al.), U.S. Pat. No. 3,928,517 (Knight et al.), U.S. Pat. No. 4,707,265 (Barnes, Jr. et al.), and U.S. Pat. No. 5,458,782 (Hou et al.).

In other embodiments, the porous substrate can be a nonwoven web, which can include nonwoven webs manufactured by any of the commonly known processes for producing nonwoven webs. As used herein, the term "nonwoven web" refers to a fabric that has a structure of individual fibers or filaments that are randomly and/or unidirectionally interlaid in a mat-like fashion.

For example, the fibrous nonwoven web can be made by wet laid, carded, air laid, spunlaced, spunbonding, or melt-blowing techniques, or combinations thereof. Spunbonded fibers are typically small diameter fibers that are formed by extruding molten thermoplastic polymer as filaments from a plurality of fine, usually circular capillaries of a spinneret, with the diameter of the extruded fibers being rapidly reduced. Meltblown fibers are typically formed by extruding molten thermoplastic material through a plurality of fine, usually circular, die capillaries as molten threads or filaments into a high velocity, usually heated gas (for example, air) stream, which attenuates the filaments of molten thermoplastic material to reduce their diameter. Thereafter, the meltblown fibers are carried by the high velocity gas stream and are deposited on a collecting surface to form a web of randomly-dispersed, meltblown fibers. Any of the nonwoven webs can be made from a single type of fiber or from two or more fibers that differ in the type of thermoplastic polymer and/or thickness.

Further details of manufacturing methods of useful nonwoven webs have been described by Wente in "Superfine Thermoplastic Fibers," *Indus. Eng. Chem.*, 48, 1342 (1956) and by Wente et al. in "Manufacture of Superfine Organic Fibers," Naval Research Laboratories Report No. 4364 (1954).

The nonwoven web substrate may optionally further comprise one or more layers of scrim. For example, either or both major surfaces of the nonwoven web may each optionally further comprise a scrim layer. The scrim, which is typically a woven or nonwoven reinforcement layer made from fibers, is included to provide strength to the nonwoven web. Suitable scrim materials include, but are not limited to, nylon, polyester, fiberglass, polyethylene, polypropylene, and the like. The average thickness of the scrim can vary but often ranges from about 25 to about 100 micrometers, preferably about 25 to about 50 micrometers. The scrim layer may optionally be bonded to the nonwoven article. A variety of adhesive materials can be used to bond the scrim to the nonwoven. Alternatively, the scrim may be heat-bonded to the nonwoven web.

The porosity of nonwoven substrates is typically characterized by properties such as fiber diameter, or basis weight, or solidity, rather than by pore size. The fibers of the nonwoven substrate are typically microfibers having an effective fiber diameter of from at least 0.5, 1, 2, or even 4 micrometers and at most 15, 10, 8, or even 6 micrometers, as calculated according to the method set forth in Davies, C. N., "The Separation of Airborne Dust and Particles," Institution of Mechanical Engineers, London, Proceedings 1B, 1952. The nonwoven substrate preferably has a basis weight in the range of at least 5, 10, 20, or even 50 g/m$^2$; and at most 800, 600, 400, 200, or even 100 g/m$^2$. The minimum tensile strength of the nonwoven web is about 4.0 Newtons. It is generally recognized that the tensile strength of nonwoven substrates is lower in the machine direction than in the cross-web direction due to better fiber bonding and entanglement in the latter.

Nonwoven web loft is measured by solidity, a parameter that defines the solids fraction in a volume of web. Lower solidity values are indicative of greater web loft. Solidity ($\alpha$) is a unitless fraction typically represented by: $\alpha = m_f \div \rho_f \times L_{nonwoven}$ where $m_f$ is the fiber mass per sample surface area, $\rho_f$ is the fiber density, and $L_{nonwoven}$ is the nonwoven thickness. Solidity is used herein to refer to the nonwoven substrate itself and not to the functionalized nonwoven substrate. When a nonwoven substrate contains mixtures of two or more kinds of fibers, the individual solidities are determined for each kind of fiber using the same $L_{nonwoven}$ and these individual solidities are added together to obtain the web's solidity, $\alpha$.

The first articles include a functionalized substrate having a plurality of thiocarbonylthio-containing groups directly and covalently attached to the surface of the polymeric substrate. The thiocarbonylthio-containing groups are typically covalently attached to carbon atoms on a polymeric backbone of the solid polymeric substrate. The thiocarbonylthio-containing groups are covalently attached by reacting with a free radical on a surface of the solid polymeric substrate. Various methods can be used to generate the free radicals on this surface. Polymeric substrates having free radicals available for further reaction are referred to as treated substrates.

In a first method of forming a treated substrate, an imbibing solution is prepared. The imbibing solution contains a Type II photoinitiator dissolved in a solvent. The solvent can include water and/or organic solvents. The imbibing solution is applied to a surface of the polymeric substrate as a coating layer. The coating layer is then exposed to actinic radiation, which is typically in the ultraviolet region of the electromagnetic spectrum. Upon exposure to the actinic radiation, the Type II photoinitiator abstracts a hydrogen from the polymeric substrate resulting in the generation of free radicals on its surface and the formation of the treated substrate.

Type II photoinitiators included in the imbibing solution are typically aromatic ketone compounds. Examples include, but are not limited to, benzophenone, carboxybenzophenone, 4-(3-sulfopropyloxy)benzophenone sodium salt, Michler's ketone, benzil, anthraquinone, 5,12-naphthacenequinone, aceanthracenequinone, benz(A)anthracene-7,12-dione, 1,4-chrysenequinone, 6,13-pentacenequinone, 5,7,12,14-pentacenetetrone, 9-fluorenone, anthrone, xanthone, thioxanthone, 2-(3-sulfopropyloxy)thioxanthen-9-one, acridone, dibenzosuberone, acetophenone, and chromone.

The imbibing solution can contain any suitable amount of the Type II photoinitiator. The concentration is often in a range of 0.1 to 20 weight percent based on a total weight of the Type II photoinitiator and the solvent. For example, the concentration can be at least 0.2 weight percent, at least 0.5 weight percent, at least 1 weight percent, at least 2 weight percent, or at least 5 weight percent and, depending on its solubility in the solvent, can be up to 20 weight percent, up to 16 weight percent, up to 12 weight percent, up to 10 weight percent, up to 8 weight percent, up to 6 weight percent, or up to 5 weight percent.

Suitable solvents for use in the imbibing solution are typically organic solvents but can be water (when the Type II photoinitiator is water soluble) or a mixture of water and an organic solvent. Suitable non-protic polar organic solvents include esters (e.g., ethyl acetate, propyl acetate), alkoxyalkyl acetates (e.g., methoxyethyl acetate, ethoxyethyl acetate, propoxyethyl acetate, and butoxyethyl acetate), trialkyl phosphates such as triethylphosphate, ketones (e.g., acetone, methyl ethyl ketone, methyl propyl ketone, and methyl isobutyl ketone), sulfoxides (e.g., dimethyl sulfoxide). Suitable protic polar organic solvents include alcohols (e.g., methanol, ethanol, propanol, isopropanol, n-butanol, and tert-butyl alcohol), glycols (e.g., ethylene glycol and propylene glycol), glycol ethers (e.g., methoxyethanol, ethoxyethanol, propoxyethanol, butoxyethanol, methyl carbitol and ethyl carbitol), and mixtures thereof. The solvent can be water (for example, when the Type II photoinitiator is soluble in water) or can be an organic solvent mixed with water, if desired. Suitable non-polar organic solvents include alkanes (e.g., pentane, hexane, heptane, isooctane, and decane), aromatic solvents (e.g., benzene, toluene, and xylene), and ethers (e.g., diethyl ether, tetrahydrofuran, dioxane). Although they may be useful in some instances, most alcohols and ethers are not preferred as solvents due to their propensity for undergoing interfering hydrogen abstraction reactions.

Any method of application of the imbibing solution can be used. In many processes, the imbibing solution is applied as a coating layer to the polymeric substrate. If the polymeric substrate is porous, pressure can be applied to remove air bubbles and excess imbibing solution before exposing the treated substrate to actinic radiation. For example, a cover film that is transparent to the actinic radiation can be applied such that the imbibing coating layer is positioned between the polymeric substrate and the cover film. Pressure can be applied to the surface of the cover film opposite the imbibing coating.

The source of actinic radiation is often an ultraviolet (UV) light source. UV light can be provided by various light sources such as light emitting diodes (LEDs), black lights, medium pressure mercury lamps, etc. or a combination thereof. The actinic radiation can also be provided with higher intensity light sources such as those available from Fusion UV Systems Inc. The ultraviolet light sources can be relatively low light intensity sources such as black lights that provide generally 10 mW/cm$^2$ or less (as measured in accordance with procedures approved by the United States National Institute of Standards and Technology as, for example, with a UVIMAP™ UM 365 L-S radiometer manufactured by Electronic Instrumentation & Technology, Inc., in Sterling, Va.) over a wavelength range of 280 to 400 nanometers. Alternatively, relatively high light intensity sources such as medium pressure mercury lamps can be used that provide intensities generally greater than 10 mW/cm$^2$, preferably between 15 and 450 mW/cm$^2$. The exposure time can be up to about 30 minutes or even longer.

In some embodiments, it is preferable to use lights that emit a narrow spectrum of light in the ultraviolet region of the electromagnetic spectrum. These light sources, which include LEDs and lasers, can enhance the rate of free radical generation, or can enhance the rate of polymerization while maintaining the reactive nature of the polymeric material in subsequent monomer grafting steps.

The thiocarbonylthio-containing compound can be present when free radicals are generated on the surface of the solid polymeric substrates or can be introduced after generation of the free radicals. If the thiocarbonylthio-containing compound is present during free radical generation, it is typically dissolved in the imbibing solution along with the Type II photoinitiator. If the thiocarbonylthio-containing compound is not present during free radical generation, the intermediate radical derived from the Type II photoinitiator via hydrogen abstraction typically couples with the radical on the surface of the substrate to form a hemi-pinacol type compound. The thiocarbonylthio-containing compound can be applied as a second coating layer to the solid polymeric substrate comprising hemi-pinacol groups. The coated substrate is again exposed to actinic radiation to regenerate the substrate radical and transfer the thiocarbonylthio-containing group to the surface of the substrate.

In other processes for generating free radicals on a surface of the polymeric substrate, the substrate itself is photoactive. An imbibing solution is prepared containing the thiocarbonylthio-containing compound dissolved in a solvent. The imbibing solution is applied to a surface of the polymeric substrate as a coating layer. The coating layer is then exposed to actinic radiation, which is typically in the ultraviolet region of the electromagnetic spectrum. Upon exposure to the actinic radiation, the polymeric substrate absorbs enough energy that some of its covalent bonds are broken, resulting in the generation of free radicals on its surface and the formation of a treated substrate. The thiocarbonylthio-containing group is subsequently transferred to the substrate. Examples of photoactive polymeric substrates include polysulfones and poly(ether sulfones). Other photoactive polymeric substrates often contain an aromatic group such as, for example, homopolymers and block copolymers of poly(methylphenylsilane) and various polyimides based on benzophenone tetracarboxylic dianhydride.

In other processes for generating free radicals on a surface of the polymeric substrate, ionizing radiation is used rather than a Type II photoinitiator. As used herein, the term "ionizing radiation" refers to radiation that is of a sufficient dose and energy to form free radical reaction sites on the surface and/or in the bulk of the polymeric substrate. The radiation is of sufficient energy if it is absorbed by the polymeric substrate and results in the cleavage of chemical bonds in the substrate and the formation of free radicals. The ionizing radiation is often beta radiation, gamma radiation, electron beam radiation, x-ray radiation, plasma radiation, or other suitable types of electromagnetic radiation. Preferably, ionizing radiation is conducted in an inert environment to prevent oxygen from reacting with the radicals.

In many embodiments of this process, the ionizing radiation is electron beam radiation, gamma ray radiation, x-ray radiation, or plasma radiation because of the ready availability of suitable generators. Electron beam generators are commercially available such as, for example, the ESI ELECTROCURE EB SYSTEM from Energy Sciences, Inc. (Wilmington, Mass., USA) and the BROADBEAM EB PROCESSOR from E-beam Technologies (Davenport, Iowa, USA). Gamma ray radiation generators are commercially available from MDS Nordion that use a cobalt-60 high energy source.

For any given type of ionizing radiation, the dose delivered can be measured in accordance with ISO/ASTM52628-13, "Standard Practice for Dosimetry in Radiation Processing," by ASTM International (West Conshohocken, Pa.). By altering the extractor grid voltage, beam diameter, exposure time, and distance from the irradiation source, various dose rates can be obtained.

When ionizing radiation is used, the free radicals are typically formed on a surface of the polymeric substrate prior to contact with the thiocarbonylthio-containing compound. That is, there is a first step of generating the free radicals on the surface of the solid polymeric substrate to form a treated substrate and a second step of applying a coating layer of the thiocarbonylthio-containing compound to the treated substrate. The thiocarbonylthio-containing compound and the polymeric substrate having free radicals (i.e., treated substrate) react to covalently attach thiocarbonylthio-containing groups to the polymeric substrate forming a functionalized substrate.

The thiocarbonylthio-containing group is typically attached to (e.g., grafted to) the polymeric substrate in the functionalized substrate. In most cases, the thiocarbonylthio-containing group is directly attached to a carbon atom of the polymeric substrate. There is typically no intervening linking group such as an ester linkage, amide linkage, urethane linkage, ether linkage, siloxane linkage, or the like between the polymeric substrate and the thiocarbonyl-containing group. The thiocarbonyl-containing groups are often not those that are known to be effective as agents for reversible addition-fragmentation chain transfer (RAFT) polymerization reactions.

In many embodiments, the thiocarbonylthio-containing group is of formula —S—C(=S)—$R^1$. Group $R^1$ in the thiocarbonylthio-containing group is typically selected to be an alkoxy, aralkyloxy, alkenyloxy or —N($R^4$)$_2$. Each $R^4$ is an alkyl or two adjacent $R^4$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic.

Suitable alkoxy groups for $R^1$ typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkoxy groups have 1 to 20 carbon atoms, 1 to 10 carbon atoms, 2 to 10 carbon atoms, 1 to 6 carbon atoms, 2 to 6 carbon atoms, or 1 to 4 carbon atoms.

Suitable alkenyloxy groups for $R^1$ typically have at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkenyloxy groups have 2 to 20 carbon atoms, 2 to 10 carbon atoms, 2 to 6 carbon atoms, or 2 to 4 carbon atoms.

Suitable aralkyloxy groups for $R^1$ typically contains an alkylene group having 1 to 10 carbon atoms, 1 to 6 carbon atoms, or 1 to 4 carbon atoms and an aryl group having 5 to 12 carbon atoms, 6 to 12 carbon atoms, or 6 to 10 carbon atoms. The aryl group in the aralkyloxy group is often phenyl.

In some embodiments of the thiocarbonylthio-containing group, $R^1$ is of formula —N($R^4$)$_2$ where each $R^4$ is an alkyl or where the two adjacent $R^4$ groups are combined with the nitrogen to which they are both attached to form a first heterocyclic ring having 1 to 3 heteroatoms selected from nitrogen, oxygen, and sulfur and 2 to 5 carbon atoms, the first heterocyclic ring being saturated or unsaturated (e.g., partially or fully unsaturated) and optionally fused to one or more second rings that are carbocyclic or heterocyclic.

Suitable alkyl $R^4$ groups typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms.

When the formula —$N(R^4)_2$ forms a first heterocyclic ring, the heterocyclic ring typically has a first ring structure with 5 to 7 ring members or 5 to 6 ring members and with 1 to 3 heteroatoms or 1 to 2 heteroatoms in the ring. Ring members that are not a heteroatom are carbon. If there is one heteroatom in the first ring structure, the heteroatom is nitrogen. If there are two or three heteroatoms in the first ring structure, one heteroatom is nitrogen and any additional heteroatom is selected from nitrogen, oxygen, and sulfur. The first ring optionally can be fused to one or more second ring structures that are heterocyclic or carbocyclic and saturated or unsaturated (e.g., partially or fully unsaturated). If the second ring structure is heterocyclic, it typically has 5 to 7 or 5 to 6 ring members and 1, 2, or 3 heteroatoms selected from nitrogen, oxygen, and sulfur. If the second ring structure is carbocyclic, it is often benzene or a saturated ring having 5 or 6 ring members. In many embodiments, the heterocyclic ring has a single ring structure with 5 or 6 ring members and with either 1 or 2 heteroatoms in the ring. Examples of heterocyclic rings include, but are not limited to, morpholino, thiomorpholino, pyrrolidinyl, piperidinyl, homo-piperidinyl, indolyl, carbazolyl, imidazolyl, and pyrazolyl.

The thiocarbonylthio-containing compound can be represented by the general formula Q—S—C(=S)—$R^1$ where Q is the remainder of the compound. Group Q can include a second group (or even a third group) of formula —S—C(=S)—$R^1$ if the thiocarbonylthio-containing compound contains more than one such group. Group $R^1$ is the same as defined above. The thiocarbonylthio-containing compound reacts with a solid polymeric substrate (SS) as shown in Reaction Scheme A.

Reaction Scheme A

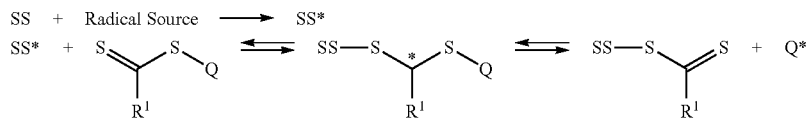

In Reaction Scheme A, free radical sites are first generated on the solid substrate. SS* represents the solid polymeric substrate having free radicals (i.e., treated substrate). When the thiocarbonylthio-containing compound is contacted with the solid substrate having free radicals, the group —S—C(=S)—$R^1$ is transferred to the solid substrate via an intermediate sulfur-stabilized radical that subsequently expels the radical Q*. This results in a radical transfer from the surface of the substrate to group Q of the thiocarbonylthio-containing compound. The reactions in the second equation of Reaction Scheme A are indicated as being reversible; however, the reactions are not necessarily reversible provided that the forward reactions can occur. The functional substrate is SS—S—C(=S)—$R^1$. Although Reaction Scheme A shows only one —S—C(=S)—$R^1$ group attached to the solid substrate for simplicity sake, there are a plurality of such attached groups on the functionalized substrate.

Group Q in the thiocarbonylthio-containing compound becomes a free radical during the transfer process shown in Reaction Scheme A. This group can be selected so that the S-Q bond is sufficiently weak to allow homolytic cleavage without any side reactions. In contrast to typical RAFT polymerization reactions, the expelled radical (Q*) does not need to be selected so that it can initiate free radical polymerization reactions because there are no monomers present at the time the thiocarbonylthio-containing group is covalently attached to the solid substrate. This allows the use of thiocarbonylthio-containing compounds that would ordinarily not be used in typical RAFT controlled radical polymerization reactions.

Thus, the expelled radical (Q*) may be a primary radical, as opposed to the secondary or tertiary radicals used in typical RAFT polymerizations. The expelled radical may cause reversal of the transfer reaction (i.e., if the reactions shown in the second step of Reaction Scheme A are reversible, the covalently attached group —S—C(=S)—$R^1$ can combine with the expelled radical (Q*) to reform Q-S—C(=S)—$R^1$, resulting in the reformation of a radical on the surface of the substrate). Alternatively, the expelled radical (Q*) may become deactivated in a variety of radical termination processes well known in the art, such as by coupling to form Q-Q.

Some example thiocarbonylthio-containing compounds are the symmetrical compounds of Formula (I).

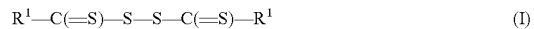

Group $R^1$ is the same as defined above. Examples of thiocarbonylthio-containing compounds of Formula (I) include, but are not limited to, dixanthogen (where $R^1$ is an ethoxy) and tetraethylthiuram disulfide (where is $R^1$ is of formula —$N(R^4)_2$ where each $R^4$ is ethyl).

Other example thiocarbonylthio-containing compounds are of Formula (II).

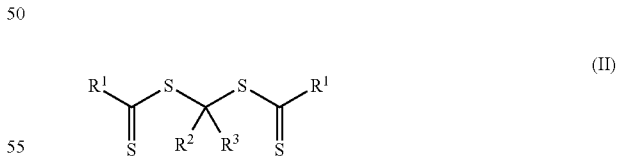

In Formula (II), each $R^1$ is an alkoxy, aralkyloxy, alkenyloxy, or —$N(R^4)_2$. Suitable alkoxy, aralkyloxy, alkenyloxy, and —$N(R^4)_2$ groups for $R^1$ are the same as described above for the thiocarbonylthio-containing group. Group $R^2$ is of formula —$(OR^5)_q$—$OR^6$ or of formula —C(=O)—X—$R^7$. Group $R^3$ is hydrogen, alkyl, aryl, substituted aryl (i.e., an aryl substituted with at least one alkyl, alkoxy, or halo), alkaryl, a group of formula —C(=O)—$OR^8$, or a group of formula —C(=O)—$N(R^9)_2$. Group $R^5$ is an alkylene, group $R^6$ is an alkyl, and q is an integer equal to at least 0. Group $R^7$ is hydrogen, alkyl, aryl, aralkyl, or substituted aryl (i.e., an aryl substituted with at least one alkyl, alkoxy, or halo). Group $R^8$ and $R^9$ are each independently an alkyl, aryl, aralkyl, or alkaryl. Group X is a single bond, oxy, or —$NR^{10}$. Group $R^{10}$ is hydrogen, alkyl, aryl, aralkyl, or alkaryl.

In some embodiments of Formula (II), group $R^2$ is of formula —$(OR^5)_q$—$OR^6$. In formula —$(OR^5)_q$—$OR^6$, the variable q is an integer equal to at least 0. Stated differently, $R^2$ forms an ether or polyether group with the carbon atom to which it is attached (i.e., the carbon atom between the two dithiocarbamate or dithiocarbonate groups). In many embodiments, q is equal to 0, at least 1, at least 2, or at least 3 and up to 20 or more, up to 10, up to 8, up to 6, up to 4, or up to 2. For example, q can be in a range of 0 to 20, 0 to 10, 0 to 6, 0 to 4, or 0 to 2. When q is equal to 0, $R^2$ is equal to an alkoxy group of formula —$OR^6$. Group $R^6$ is an alkyl. Group $R^5$, if present, is an alkylene. Suitable alkyl and alkylene groups for $R^5$ and $R^6$ typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl and alkylene groups have 1 to 20 carbon atoms, 1 to 10 carbon atoms, 2 to 10 carbon atoms, 1 to 6 carbon atoms, 2 to 6 carbon atoms, or 1 to 4 carbon atoms. In many examples, where $R^2$ is of formula —$(OR^5)_q$—$OR^6$, q is 0 and $R^2$ is of formula —$OR^6$.

In other embodiments of Formula (II), group $R^2$ is of formula —C(=O)—X—$R^7$ where $R^7$ is hydrogen, alkyl, aryl, substituted alkyl, or alkaryl and where X is a single bond, oxy or —$NR^{10}$— with $R^{10}$ being hydrogen, alkyl, aryl, aralkyl, or alkaryl. That is, $R^2$ is an ester group when X is —oxy, an amide group when X is —$NR^{10}$—, and a ketone group when X is a single bond. When $R^7$ and/or $R^{10}$ is an alkyl, the alkyl group typically has at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms. When $R^7$ and/or $R^{10}$ is an aryl, the aryl often has 5 to 12 carbon atoms, 6 to 12 carbon atoms, or 6 to 10 carbon atoms. The aryl is often phenyl. When $R^7$ and/or $R^{10}$ is an alkaryl, the alkaryl group often contains an arylene group having 5 to 12 carbon atoms, 6 to 12 carbon atoms, or 6 to 10 carbon atoms and an alkyl group having 1 to 10 carbon atoms, 1 to 6 carbon atoms, or 1 to 4 carbon atoms. The arylene group in the alkaryl group is often phenylene or biphenylene. When $R^{10}$ is an aralkyl, the aralkyl group often contains an alkylene group having 1 to 10 carbon atoms, 1 to 6 carbon atoms, or 1 to 4 carbon atoms and an aryl group having 5 to 12 carbon atoms, 6 to 12 carbon atoms, or 6 to 10 carbon atoms. The aryl group in the aralkyl group is often phenyl. When $R^7$ is a substituted aryl, it can be substituted with an alkyl, alkoxy, or halo. The alkyl and alkoxy substitution group often have 1 to 10 carbon atoms, 1 to 6 carbon atoms, or 1 to 4 carbon atoms and an aryl group having 5 to 12 carbon atoms, 6 to 12 carbon atoms, or 6 to 10 carbon atoms. The halo substitution group can be chloro, bromo, fluoro, or iodo.

Often, when $R^2$ is a group of formula —C(=O)—X—$R^7$, $R^7$ is an alkyl. Group X is often a single bond, oxy, or —NH—.

In many embodiments of Formula (II), the group $R^3$ is hydrogen. That is, Formula (II) is often of Formula (II-1).

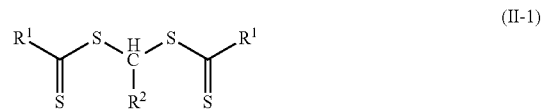

In other embodiments of Formula (II), group $R^3$ is an alkyl, aryl, aralkyl, alkaryl, a group of formula —C(=O)—$OR^8$, or a group of formula —C(=O)—$N(R^9)_2$. Groups $R^8$ and $R^9$ are each an alkyl, aryl, aralkyl, alkaryl. Where $R^3$ and/or $R^8$ and/or $R^9$ is an alkyl, the alkyl group typically has at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms. Where $R^3$ and/or $R^8$ and/or $R^9$ is an aryl, the aryl often has 5 to 12 carbon atoms, 6 to 12 carbon atoms, or 6 to 10 carbon atoms. The aryl is often phenyl. When $R^3$ and/or $R^8$ and/or $R^9$ is an alkaryl, the alkaryl group often contains an arylene group having 5 to 12 carbon atoms, 6 to 12 carbon atoms, or 6 to 10 carbon atoms and an alkyl group having 1 to 10 carbon atoms, 1 to 6 carbon atoms, or 1 to 4 carbon atoms. The arylene group in the alkaryl group is often phenylene or biphenylene. Where $R^3$ and/or $R^8$ and/or $R^9$ is an aralkyl, the aralkyl group often contains an alkylene group having 1 to 10 carbon atoms, 1 to 6 carbon atoms, or 1 to 4 carbon atoms and an aryl group having 5 to 12 carbon atoms, 6 to 12 carbon atoms, or 6 to 10 carbon atoms. The aryl group in the aralkyl group is often phenyl.

The compounds of Formula (II) can be formed using any suitable method. One such method is shown in Reaction Scheme B for compounds where $R^2$ is of formula —$(OR^5)_q$—$OR^6$. In many such compounds, q is zero and $R^2$ is —$OR^6$.

Reaction Scheme B

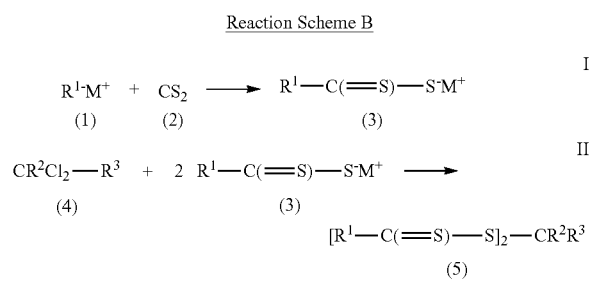

In reaction II, a compound of formula (4) is reacted with a compound of formula (3) to prepare the compound of formula (5), which corresponds to Formula (II) above. Reaction II is typically conducted at temperatures between about 0° C. and about 80° C. in the presence of an organic solvent such as acetone, acetonitrile, or an alcohol. The compound of formula (3) can be formed, for example, by treating a salt of formula (1) with carbon disulfide (Reaction I). Compound (1) is a salt of an alkoxide, aryloxide, or amine where M+ is an alkali metal, a tetraalkyl ammonium ion, a trialkyl ammonium ion, or a dialkylammonium ion.

In some examples of Reaction Scheme B, a commercially available compound (4) is reacted with a commercially available compound (3). Commercially available examples of compound (4) include, but are not limited to, dichloromethyl methyl ether, dichloromethyl butyl ether, methyl dichloromethoxyacetate. Commercially available examples of compound (3) include, but are not limited to, sodium diethyldithiocarbamate trihydrate and various xanthate salts such as potassium ethyl xanthate, sodium ethyl xanthate, potassium isopropyl xanthate, sodium isopropyl xanthate, and potassium amyl xanthate.

Another method is shown in Reaction Scheme C for preparing compounds of Formula (II) where $R^2$ is an amide or ester group of formula —C(=O)—X—$R^7$ and $R^3$ is hydrogen.

Reaction Scheme C

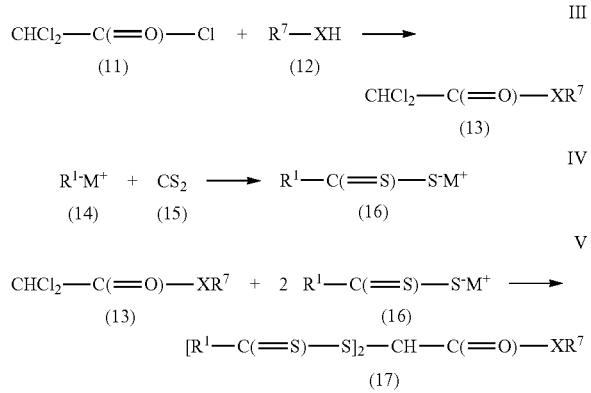

In this reaction scheme, dichloroacetyl chloride (compound (11)) is reacted (Reaction III) with a compound of formula $R^7$—XH (compound (12)), which is an alcohol ($R^7$—OH) or an amine ($R^7$—NR$^{10}$H). That is, X is either oxy or —N($R^{10}$)—. Reaction III often is conducted in the presence of a base such as, for example, trimethylamine and a catalyst such as, for example, pyridine or dimethylaminopyridine. Any organic solvent that is present is usually an aprotic solvent such as methylene chloride or tetrahydrofuran. The product of Reaction III is compound (13) of formula CHCl$_2$—C(=O)—XR$^7$. Compound (13) is reacted (Reaction V) with compound (16), which can be formed by the reaction (Reaction IV) of a compound of formula $R^1$-M$^+$ (compound (14)) with carbon disulfide (15). Compound (14) is a salt of an alkoxide or of an amine where M$^+$ is usually an alkali metal ion, a tetraalkyl ammonium ion, a trialkyl ammonium ion, or a dialkylammonium ion. The reaction (Reaction V) of compound (13) with compound (16) is typically conducted at temperatures between about 0° C. and about 80° C. in the presence of an organic solvent such as acetone, acetonitrile, or an alcohol.

In some examples of Reaction Scheme C, commercially available compounds of formula CHCl$_2$—C(=O)—XR$^7$, which is compound (13), are reacted with commercially available compounds of formula $R^1$—C(=S)—S$^-$M$^+$, which is compound (16). Examples of commercially available compound (13) include, but are not limited to, methyl dichloroacetate, ethyl dichloroacetate, and butyl dichloroacetate. Examples of commercially available compound (16) include, but are not limited to, sodium diethyldithiocarbamate trihydrate and various xanthate salts such as potassium ethyl xanthate, sodium ethyl xanthate, potassium isopropyl xanthate, sodium isopropyl xanthate, and potassium amyl xanthate.

Another method of forming the compounds of Formula (II) is shown in Reaction Scheme D for compounds where $R^2$ is a ketone group of formula —C(=O)—$R^7$ and $R^3$ is hydrogen. To be a ketone group, X in the formula —CO—X—$R^7$ is a single bond.

Reaction Scheme D

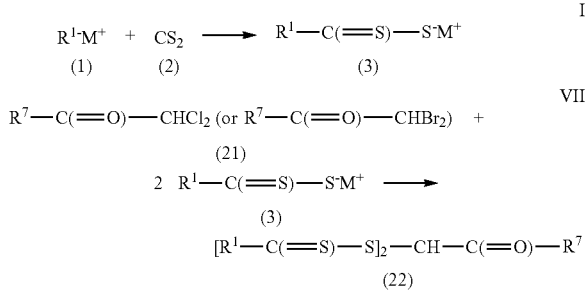

In this reaction scheme, a dihalo ketone compound (compound (21)) is reacted with a compound of formula $R^1$—C(=S)—S$^-$M$^+$, which is compound (3) as shown in Reaction VII. Compound (3) can be formed, for example, by treating a salt of formula (1) with carbon disulfide (Reaction I). Compound (1) is a salt of an alkoxide, aryloxide, or amine where M+ is an alkali metal, a tetraalkyl ammonium ion, a trialkyl ammonium ion, or a dialkylammonium ion. Reaction I is often conducted at temperatures between about 0° C. and about 80° C. in the presence of an organic solvent such as acetone, acetonitrile, or an alcohol. The reaction (Reaction VII) of compound (21) with compound (3) is typically conducted at temperatures between about 0° C. and about 80° C. in the presence of an organic solvent such as acetone, acetonitrile, or an alcohol.

In some examples of Reaction Scheme D, commercially available compounds of formula $R^2$—C(=O)—CHCl$_2$ and $R^2$—C(=O)—CHBr$_2$ (compound (21)) include 1,1-dichloropropan-2-one, 2,2-dichloro-1-phenyl-ethanone, 2,2-dibromo-1-(4-bromophenyl)ethanone, 1,1-dichloro-3,3-dimethyl-2-butanone, and 1,1-dichloro-3,3-dimethyl-2-butanone. Examples of compound (3) include, but are not limited to, sodium diethyldithiocarbamate trihydrate and various xanthate salts such as potassium ethyl xanthate, sodium ethyl xanthate, potassium isopropyl xanthate, sodium isopropyl xanthate, and potassium amyl xanthate.

In some embodiments of the compound of Formula (II), group $R^1$ is an alkoxy, aryloxy, aralkyloxy, or alkenyloxy group. Such $R^1$ groups are of formula —OR$^{11}$ where $R^{11}$ is an alkyl, aryl, aralkyl, or alkenyl group. That is the compound is of Formula (II-A).

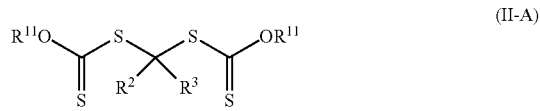

These compounds are bis-dithiocarbonate compounds having a single carbon atom between the two dithiocarbonate groups.

In some other more specific compounds of Formula (II-A), $R^{11}$ is an alkenyl (i.e., —OR$^{11}$ is an alkenyloxy), $R^2$ is an alkoxy ($R^2$ is of formula —(OR$^5$)$_q$—OR$^6$ where q is zero, which is equal to —OR$^6$), and $R^3$ is hydrogen. A specific example compound includes, but is not limited to, 1,1-bis(10-undecenyloxycarbothioylsulfanyl)methyl ether.

In other more specific compounds of Formula (II-A), $R^{11}$ is an alkyl (i.e., —$OR^{11}$ is an alkoxy), $R^2$ is an alkoxy ($R^2$ is of formula —$(OR^5)_q$—$OR^6$ where q is zero, which is equal to —$OR^6$), and $R^3$ is of formula —$C(=O)$—$OR^8$ where $R^8$ is an alkyl. A specific example is methyl 2,2-bis(isopropoxycarbothioylsulfanyl)-2-methoxy-acetate.

In some embodiments of Formula (II-A), $R^3$ is hydrogen, $R^2$ is an alkoxy ($R^2$ is of formula —$(OR^5)_q$—$OR^6$ where q is zero, which is equal to —$OR^6$), and $R^1$ of Formula (II) is an alkoxy, aralkyloxy, or alkenyloxy. Such compounds are of Formula (II-A1).

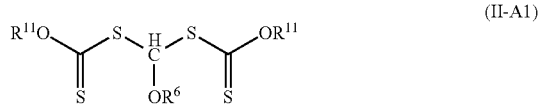

Groups $R^{11}$ is an alkyl, aralkyl, or alkenyl. In many embodiments of Formula (II-A1), $R^6$ is an alkyl. Specific example compounds include, but are not limited to, 1,1-bis(isopropoxycarbothioylsulfanyl)methyl methyl ether, 1,1-bis(isopropoxycarbothioylsulfanyl)methyl butyl ether, or 1,1-bis(ethoxycarbothioylsulfanyl)methyl butyl ether.

In other embodiments of Formula (II-A), $R^3$ is hydrogen, $R^2$ is a group of formula —$C(=O)$—$X$—$R^7$, and $R^1$ is an alkoxy, aralkyloxy, or alkenyloxy. Such compounds are of Formula (II-A2).

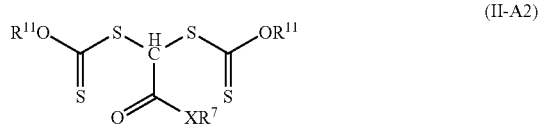

Groups $R^{11}$ is an alkyl, aralkyl, or alkenyl. The group $R^{11}$ is often an alkyl. Examples of compounds of Formula (II-A2 where X is equal to oxy and $R^7$ is an alkyl include, but are not limited to, 2-ethylhexyl 2,2-bis(isopropoxycarbothioylsulfanyl)acetate, methyl 2,2-bis(isopropoxycarbothioylsulfanyl)acetate, and tert-butyl 2,2-bis(isopropoxycarbothioylsulfanyl)acetate. An example compound of Formula (II-A2) where X is a single bond and $R^7$ is an alkyl is 1,1-bis(isopropoxycarbothioylsulfanyl)-2-propanone.

Examples of compounds of Formula (II-A2) where X is a single bond and $R^7$ is an aryl or substituted aryl are 2,2-bis(isopropoxycarbothioylsulfanyl)-1-phenyl ethanone and 2,2-bis(isopropoxycarbothioylsulfanyl)-1-(4-bromophenyl) ethanone. An example of a compound of Formula (II-A2) where X is equal to oxy and $R^7$ is an aryl is phenyl 2,2-bis(isopropoxycarbothioylsulfanyl)acetate. An example of a compound of Formula (II-A2) where X is equal to —$NR^{10}$— is N,N-dibutyl-2,2-bis(isopropoxycarbothioylsulfanyl)acetamide. In this compound both $R^7$ and $R^{10}$ are alkyl (i.e., butyl) groups.

In other embodiments of the compound of Formula (II), group $R^1$ is of formula —$N(R^4)_2$ as shown in Formula (II-B).

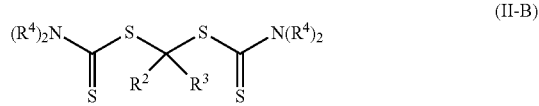

These compounds are bis-dithiocarbamate compounds having a single carbon atom between the two dithiocarbonate groups.

In some embodiments of Formula (II-B), $R^3$ is hydrogen and $R^2$ is an alkoxy ($R^2$ is of formula —$(OR^5)_p$—$OR^6$ where p is zero, which is equal to —$OR^6$). Such compounds are of Formula (II-B1).

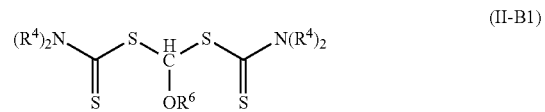

In many such compounds, each $R^4$ is an alkyl. Specific example compounds include, but are not limited to, 1,1-bis(diethylcarbamothioylsulfanyl)methyl butyl ether and 1,1-bis(diethylcarbamothioylsulfanyl)methyl methyl ether.

In other embodiments of Formula (II-B), $R^3$ is hydrogen and $R^2$ is a group of formula —$C(=O)$—$X$—$R^7$. Such compounds are of Formula (II-B2).

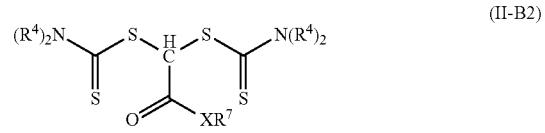

The group $R^7$ is often an alkyl. Examples of compounds of Formula (II-B2) where X is equal to oxy and $R^7$ is an alkyl include, but are not limited to, 2-ethylhexyl 2,2-bis(diethylcarbamothioylsulfanyl)acetate, methyl 2,2-bis(diethylcarbamothioylsulfanyl)acetate, and octyl 2,2-bis(diethylcarbamothioylsulfanyl)acetate.

Other example thiocarbonylthio-containing compounds are of Formula (III).

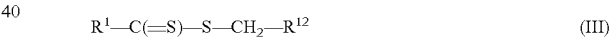

Group $R^1$ is the same as defined above for the thiocarbonylthio-containing group. $R^{12}$ is a group of formula —$C(=O)$—$OR^{13}$ where each $R^{13}$ is hydrogen, alkyl, aryl, aralkyl, or alkaryl, a group of formula —$C(=O)$—$R^{14}$ where each $R^{14}$ is independently alkyl, aryl, aralkyl, or alkaryl, a group of formula —$OR^{15}$ where $R^{15}$ is alkyl, aryl, aralkyl, or alkaryl, or a group of formula —$C(=O)$—$N(R^{16})_2$ where $R^{16}$ is each independently hydrogen or alkyl. When $R^{13}$ is hydrogen, the $R^{12}$ group may be neutralized such that it is a group of the formula —$C(=O)$—$O^-M^+$, where M+ is an alkali metal, a tetraalkyl ammonium ion, a trialkyl ammonium ion, or a dialkylammonium ion.

Suitable $R^{13}$, $R^{14}$, $R^{15}$, and $R^{16}$ alkyl groups typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms.

Suitable $R^{13}$, $R^{14}$, or $R^{15}$ aryl groups typically have 5 to 12 carbon atoms, 6 to 12 carbon atoms, or 6 to 10 carbon atoms. In many embodiments, the aryl group is phenyl.

Suitable $R^{13}$, $R^{14}$, or $R^{15}$ aralkyl groups typically contains an alkylene group having 1 to 10 carbon atoms, 1 to 6 carbon atoms, or 1 to 4 carbon atoms and an aryl group having 5 to 12 carbon atoms, 6 to 12 carbon atoms, or 6 to 10 carbon atoms. The aryl group in the aralkyl group is often phenyl.

Suitable $R^{13}$, $R^{14}$, or $R^{15}$ alkaryl groups typically contains an arylene group having 5 to 12 carbon atoms, 6 to 12 carbon atoms, or 6 to 10 carbon atoms and an alkyl group having 1 to 10 carbon atoms, 1 to 6 carbon atoms, or 1 to 4 carbon atoms. The arylene group in the alkaryl group is often phenylene or biphenylene.

The amount of the thiocarbonylthio-containing groups attached to the polymeric substrate is typically in a range of 0.1 to 100 micromoles per gram of the first article (i.e., micromoles per gram of the functionalized substrate). The amount is often at least 0.2, at least 0.5, at least 1, at least 2, at least 4, at least 5, or at least 10 micromoles per gram and is often up to 100, up to 80, up to 60, up to 40, up to 30, or up to 20 micromoles per gram.

No monomers having a radically polymerizable group such as an ethylenically unsaturated group are present when the thiocarbonylthio-containing compounds are reacted with the treated substrate. This tends to increase the likelihood that the thiocarbonylthio group will be transferred to the treated substrate, and thus may increase the density of the thiocarbonylthio-containing groups on the surface of the polymeric substrate. This also allows the preparation and isolation of a functionalized substrate with covalently attached thiocarbonylthio-containing groups in the absence of any competing polymerization or grafting reactions and may allow better control over subsequent contemplated grafting (polymerization) reactions. There is no polymeric material formed in solution simultaneously with the formation of the functionalized substrate.

The functionalized substrate is an intermediate article (i.e., first article) in the preparation of an article having attached polymeric chains (i.e., second article). More specifically, a method of preparing the second article includes preparing a reaction mixture by contacting the first article (i.e., functionalized substrate or first article) having attached thiocarbonylthio groups with a radically polymerizable monomer composition. The method yet further includes exposing the reaction mixture to actinic radiation and to form the second article with attached polymeric chains, the polymeric chains being a polymerized product of the radically polymerizable monomer composition. At least some of the polymeric chains are terminated with a thiol group or with a thiocarbonylthio-containing group.

In this method, the functionalized substrate (i.e., first article) is prepared as described above. The functionalized substrate, which has thiocarbonylthio groups of formula —SC(=S)—$R^1$ covalently attached to the surface of the polymeric substrate, is placed in contact with a radically polymerizable monomer composition to form a reaction mixture. When the reaction mixture comprising the first monomer is exposed to actinic radiation such as ultraviolet radiation, polymerization can occur with the thiocarbonylthio-containing group functioning as an iniferter (e.g., photoiniferter). The polymerization process is shown schematically in Reaction Scheme E.

Reaction Scheme E

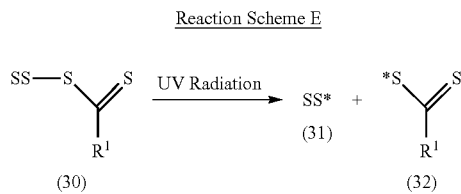

-continued

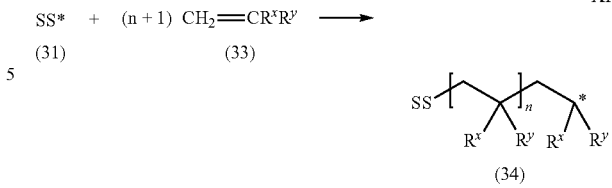

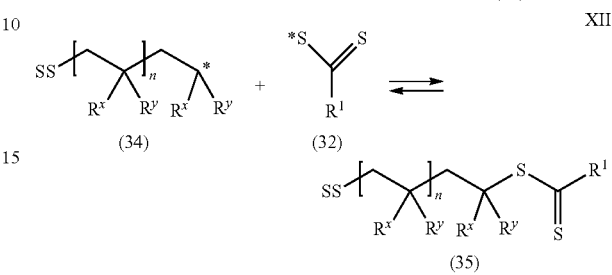

In Reaction Scheme E, exposure to actinic radiation (e.g., ultraviolet radiation) results in formation of a radical on the substrate surface (31) and a radical of the thiocarbonylthio-containing group (32) as shown in Reaction X. A first monomer (shown for simplicity as $CH_2$=$CR^xR^y$) (33) in Reaction Scheme E) reacts with the radical on the substrate surface (31) resulting in the generation of a second radical that can react with another monomer. The polymerization of the (n+1) moles of the first monomer is shown as compound (34) in Reaction XI. At any point in this process, the growing radical (34) may recombine with the thiocarbonylthio radical (32) to form a terminated chain as shown as compound (35) in Reaction XII. Upon continued exposure to actinic radiation, the radical (34) and the thiocarbonylthio radical (32) can form again from compound (35). If more monomers are present, the regenerated radical (34) can undergo further polymerization. Eventually, this radical will combine with a thiocarbonylthio radical (32). The polymerization reaction stops when exposure to actinic radiation is stopped. The product is a second article having a plurality of polymeric chains grafted to the polymeric substrate. At least some of the polymeric chains are terminated with a thiol group or a thiocarbonylthio-containing group. Often, the thiocarbonylthio-containing group is of formula —S—C(=S)—$R^1$ as shown as the product of Reaction XII.

Although less preferred, the process shown in Reaction Scheme E may also be carried out through the use of thermal energy, as is well known in the art for iniferter compounds (see, for example, T. Otsu, J. Polym. Sci., Part A: Polym Chem., 38, 2121-2136 (2000)).

In many embodiments, the monomers have ethylenically unsaturated groups. Examples of monomers with ethylenically unsaturated groups often include (meth)acrylate monomers such as alkyl (meth)acylate monomers, heteroalkyl (meth)acrylate monomers, aryl (meth)acrylate monomers, aralkyl (meth)acrylate monomers, alkaryl (meth)acrylate monomers, and various vinyl, vinyl amide, vinyl ether, or vinyl ester monomers wherein the vinyl group is not a (meth)acryloyl group. In some embodiments, the monomers include various polar monomers such as those with acidic groups or basic groups or salts thereof.

Advantageously, the polymeric chains can be varied in molecular weight depending on the amount of monomer present, the exposure time of the functionalized substrate to actinic radiation, and the concentration of groups of formula —S—C(=S)—$R^1$ on the functionalized substrate. It is believed that the molecular weight distribution of the polymeric chains is often narrower than with other methods of grafting a plurality of polymeric chains to a polymeric substrate.

When the plurality of grafted polymeric chains are terminated with thiocarbonylthio-containing groups, the second article can be subjected to further polymerization. In this method, the second article, which has polymeric chains terminated with thiocarbonylthio groups of formula —SC(=S)—$R^1$, is placed in contact with a second radically polymerizable monomer composition to form a second reaction mixture. This second radically polymerizable monomer composition may contain the same monomer(s) as in the first reaction mixture, or it may contain different monomer(s). Exposure to actinic radiation results in chain extension of the grafted polymeric chains since the thiocarbonylthio groups again can function as photoiniferters. When the monomer(s) in the second reaction mixture are different from those in the first reaction mixture, a block copolymer is formed that is grafted to the polymeric substrate.

In many second articles, at least some of the polymeric chains are terminated with thiocarbonylthio groups and/or thiol groups.

The second articles may be treated by processes, as are well known in the art, to remove the thiocarbonylthio group or to replace it with other chemical groups. Such processes are described, for example, in M. A. Harvison et al., Aust. J. Chem., 64, 992-1006 (2011).

Various embodiments are provided including a method for preparing a first article containing a solid polymeric substrate with attached thiocarbonylthio-containing groups (i.e., a functionalized substrate), a second article that contains a solid polymeric substrate with attached polymeric chains, and methods of making both articles.

Embodiment 1A is a method of making a first article comprising a functionalized substrate. The method includes providing a solid polymeric substrate and generating free radicals on a surface of the solid polymeric substrate to form a treated substrate. The method further includes reacting the free radicals of the treated substrate with a fluid comprising a thiocarbonylthio-containing compound to covalently bond a plurality of thiocarbonylthio-containing groups directly to carbon atoms in a polymeric backbone of the solid polymeric substrate and forming the functionalized substrate.

Embodiment 2A is the method of embodiment 1A, wherein generating free radicals on the surface of the solid polymeric substrate comprises applying a coating layer comprising a type II photoinitiator to the surface of the solid polymeric substrate and irradiating the coating layer with ultraviolet radiation to abstract hydrogen atoms from the solid polymeric substrate to form the treated substrate.

Embodiment 3A is the method of embodiment 2A, wherein the thiocarbonylthio-containing compound is present when generating free radicals on the surface of the solid polymeric substrate.

Embodiment 4A is the method of embodiment 1A, wherein generating free radicals on the surface of the solid polymeric substrate to form the treated substrate comprises exposing the solid polymeric substrate to electron beam radiation, gamma radiation, or to a plasma in an inert environment.

Embodiment 5A is the method of embodiment 4A, wherein the thiocarbonylthio-containing compound is absent when generating free radicals on the surface of the solid polymeric substrate.

Embodiment 6A is the method of any one of embodiments 1A to 5A, wherein the thiocarbonylthio-containing group contains at least one thiocarbonylthio-containing group of formula —S—C(=S)—$R^1$ where $R^1$ is an alkoxy, aralkyloxy, alkenyloxy, or —N($R^4$)$_2$ where each $R^4$ is an alkyl or where two adjacent $R^4$ groups are combined with the nitrogen to which they are both attached to form a first heterocyclic ring having 1 to 3 heteroatoms selected from nitrogen, oxygen, and sulfur and 2 to 5 carbon atoms, the first heterocyclic ring being saturated or unsaturated (e.g., partially or fully unsaturated) and optionally fused to one or more second rings that are carbocyclic or heterocyclic.

Embodiment 7A is the method of embodiment 6A, wherein $R^1$ is an alkoxy.

Embodiment 8A is the method of embodiment 6A, wherein $R^1$ is of formula —N($R^4$)$_2$ and each $R^4$ is an alkyl.

Embodiment 9A is the method of any one of embodiments 1A to 8A, wherein the solid polymeric substrate is porous.

Embodiment 10A is the method of embodiment 9A, wherein the solid polymeric substrate is a porous membrane.

Embodiment 11A is the method of embodiment 9A, wherein the solid polymeric substrate is a porous non-woven substrate.

Embodiment 12A is the method of any one of embodiments 1A to 11A, wherein the solid polymeric substrate is photoactive and wherein generating free radicals occurs upon exposure to actinic radiation.

Embodiment 13A is the method of embodiment 12A, wherein the solid substrate is a poly(ether sulfone).

Embodiment 1B is a first article comprising a functionalized substrate, the functionalized substrate comprising a reaction product of a reaction mixture containing a) a treated substrate comprising a solid polymeric substrate having free radicals and b) a fluid comprising a thiocarbonylthio-containing compound. The functionalized substrate has a plurality of thiocarbonylthio-containing groups directly and covalently attached to carbon atoms in a polymeric backbone of the solid polymeric substrate.

Embodiment 2B is the article of embodiment 1B, wherein the solid polymeric substrate is free of thiocarbonylthio-containing groups.

Embodiment 3B is the article of embodiment 1B or 2B, wherein the reaction mixture is free of monomers.

Embodiment 4B is the article of any one of embodiment 1B to 3B, wherein the solid polymeric substrate is porous.

Embodiment 5B is the article of embodiment 4B, wherein the solid polymeric substrate is a porous membrane.

Embodiment 6B is the article of embodiment 4B, wherein the solid polymeric substrate is a porous non-woven substrate.

Embodiment 7B is the article of any one of embodiments 1B to 6B, wherein the thiocarbonylthio-containing groups are of formula —S—C(=S)—$R^1$ wherein group $R^1$ is an alkoxy, aralkyloxy, alkenyloxy or —N($R4^2$)$_2$. Each $R^4$ is an alkyl or two adjacent $R^4$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic.

Embodiment 8B is the article of embodiment 7B, wherein $R^1$ is an alkoxy.

Embodiment 9B is the article of embodiment 7B, wherein $R^1$ is of formula —N($R^4$)$_2$ and $R^4$ is an alkyl.

Embodiment 1C is a method of making a second article having attached polymeric chains. The method includes providing a solid polymeric substrate and generating free radicals on a surface of the solid polymeric substrate to form a treated substrate. The method further includes reacting the free radicals of the treated substrate with a fluid comprising a thiocarbonylthio-containing compound to covalently bond a plurality of thiocarbonylthio-containing groups directly to carbon atoms in a polymeric backbone of the solid polymeric substrate and forming a functionalized substrate. The method further includes preparing a reaction mixture by contacting the functionalized substrate with a monomer composition comprising radically polymerizable monomers. The method still further includes exposing the reaction mixture to actinic radiation and forming a polymeric chain directly and covalently attached to the solid polymeric substrate, the polymeric chains being a polymerized product of the radically polymerizable monomer.

Embodiment 2C is the method of embodiment 1C, wherein the radically polymerizable monomers are (meth)acrylate monomers.

Embodiment 3C is the method of embodiment 1C or 2C, wherein at least some of the polymeric chains are terminated with a thiol group or a thiocarbonylthio-containing group.

Embodiment 4C is the method of any one of embodiments 1C to 3C, wherein the thiocarbonylthio-containing group contains at least one thiocarbonylthio-containing group of formula —S—C(=S)—$R^1$ where $R^1$ is an alkoxy, aralkyloxy, alkenyloxy, or —N($R^4$)$_2$ where each $R^4$ is an alkyl or where two adjacent $R^4$ groups are combined with the nitrogen to which they are both attached to form a first heterocyclic ring having 1 to 3 heteroatoms selected from nitrogen, oxygen, and sulfur and 2 to 5 carbon atoms, the first heterocyclic ring being saturated or unsaturated (e.g., partially or fully unsaturated) and optionally fused to one or more second rings that are carbocyclic or heterocyclic.

Embodiment 5C is the method of embodiment 4C, wherein $R^1$ is an alkoxy.

Embodiment 6C is the method of embodiment 4C, wherein $R^1$ is of formula —N($R^4$)$_2$ and each $R^4$ is an alkyl.

Embodiment 7C is the method of any one of embodiments 1C to 6C, wherein the solid polymeric substrate is porous.

Embodiment 8C is the method of embodiment 7C, wherein the solid polymeric substrate is a porous membrane.

Embodiment 9C is the method of embodiment 7C, wherein the solid polymeric substrate is a porous non-woven substrate.

Embodiment 10C is the method of embodiment 2C, wherein at least some of the (meth)acrylate monomers have an acidic group, a basic group, or a salt thereof.

Embodiment 1D is a second article having attached polymeric chains. The article contains a solid polymeric substrate and polymeric chains directly and covalently attached to carbon atoms in a polymeric backbone of the solid polymeric substrate. The polymeric chains comprise a polymerized product of a radically polymerizable monomer composition, wherein at least some of the polymeric chains are terminated by a thiol or a thiocarbonylthio-containing group.

Embodiment 2D is the article of embodiment 1D, wherein the solid polymeric substrate is porous.

Embodiment 3D is the article of embodiment 2D, wherein the solid polymeric substrate is a porous membrane.

Embodiment 4D is the article of embodiment 2D, wherein the solid polymeric substrate is a porous non-woven substrate.

Embodiment 5D is the article of any one of embodiments 1D to 4D, wherein the radically polymerizable monomer composition comprises (meth)acrylate monomers.

Embodiment 6D is the article of embodiment 5D, wherein at least some of the (meth)acrylate monomers have an acidic group, a basic group, or a salt thereof.

EXAMPLES $^1$H NMR Analysis

Proton nuclear magnetic resonance ($^1$H NMR) analysis was carried out using a BRUKER A500 NMR spectrometer (Bruker Corporation, Billerica, Mass.).

Combustion Ion Chromatography Analysis

Samples of the functionalized substrates (from Examples 1-42) were individually analyzed for sulfur content by combustion ion chromatography using an AQF-100 furnace (Mitsubishi Chemical Corporation, Tokyo, Japan) and an ICS-2000 ion chromatography system (Dionex Corporation, Sunnyvale, Calif.). Each sample was decomposed in the furnace and the carrier gases were bubbled through an absorber solution. The absorber solution was analyzed by ion chromatography for sulfate ion.

The instrument was calibrated by analyzing varied volumes of stock solutions containing known amounts of sulfur. A calibration curve was then created by plotting the peak area consistent with sulfate against the mass of the component in the calibration standard. Three samples from each functionalized substrate were placed into separate ceramic sample boats and analyzed in the same manner as the standards. The mean value (n=3) for sulfur content was reported as ppm of sulfur (μg S/g of sample). Based on the sulfur content measured for the sample, the concentration of the corresponding thiocarbonylthio containing groups in the sample was calculated by dividing the measured ppm of sulfur (μg S/g of sample) by 64 (the number of μg of S in one μmole of thiocarbonylthio group). The result was reported in micromoles of thiocarbonylthio groups per gram of sample (μmol/g). The results are reported in Tables 1-9.

X-Ray Fluorescence (XRF) Analysis

Three samples were cut from each functionalized substrate. Each sample was individually placed into a stainless steel XRF sample holder and secured into position using double coated tape and a hollow aluminum scatter elimination cup. Each sample was subsequently analyzed for sulfur using a Primus II wavelength dispersive X-ray fluorescence spectrometer (Rigaku Corporation, Tokyo, Japan) equipped with a rhodium X-ray source, a vacuum atmosphere, and a 20 mm diameter measurement area. The scan conditions used for sulfur (S) detection are listed in the Table A below.

TABLE A

| Element | Analytical Line | Angular Range | Step Size | Count Time | X-ray Tube Voltage/Current | Crystal | Detector |
|---|---|---|---|---|---|---|---|
| Sulfur (S) | K-α | 107.02-114.02° 2θ | 0.05° | 1.0 sec | 30/100 kV/mA | Ge | Flow Proportional Counter |

Each sample of the functionalized substrate was analyzed in triplicate. The mean value for sulfur content (n=9) was reported as ppm of sulfur (μg S/g of sample). Based on the sulfur content measured for the sample, the concentration of the corresponding thiocarbonylthio containing groups in the sample was calculated by dividing the measured ppm of sulfur (μg S/g of sample) by 64 (the number of μg of S in one μmole of thiocarbonylthio group). The result was reported in micromoles of thiocarbonylthio groups per gram of sample (μmol/g). The results are reported in Tables 10-13.

Synthesis of methyl 2-ethoxycarbothioylsulfanylacetate

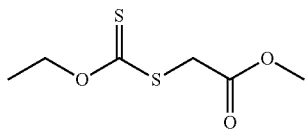

A stirred solution of methyl chloroacetate (10.85 g, available from Alfa Aesar, Haverhill, Mass.) in acetone (100 mL) was chilled in a water/ice bath. Potassium ethyl xanthate (16.0 g, available from Alfa Aesar) was added to the solution followed by an additional 50 mL of acetone. The reaction mixture was stirred for two hours and then filtered through a bed of Celite. The resulting pale-yellow solution was concentrated under reduced pressure to provide 17.68 g of methyl 2-ethoxycarbothioylsulfanylacetate as a pale yellow liquid. $^1$H-NMR (CDCl$_3$): δ 1.35 (t, 3H), 3.69 (s, 3H), 3.86 (s, 2H), 4.57 (q, 2H).

Synthesis of Dixanthogen

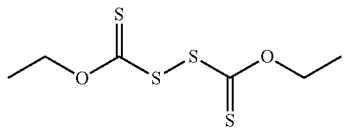

A solution of sodium peroxydisulfate [8.00 g (available from Alfa Aesar) in 50 mL of deionized water] was added dropwise over a 15 minute period to a stirred solution of potassium ethyl xanthate [10.86 g (available from Alfa Aesar) in 50 mL of deionized water]. When about half of the sodium peroxydisulfate was added, the reaction flask was warm to the touch. At this point the reaction flask was placed in a cold water bath and maintained in the bath for the remainder of the addition. The bath was removed, and the resulting reaction product was extracted with diethyl ether. The diethyl ether fraction was dried with anhydrous sodium sulfate, filtered, and concentrated under reduced pressure to provide 7.63 g of dixanthogen as a yellow oil. $^1$H-NMR (CDCl$_3$): δ 1.40 (t, 3H), 4.67 (q, 2H).

Synthesis of O-ethyl-(2-amino-2-oxo-ethyl)sulfanyl-methanethioate

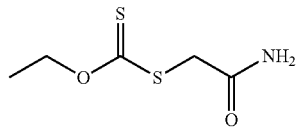

A stirred solution of bromoacetamide (10.85 g, available from Sigma-Aldrich Corporation, St. Louis, Mo.) in acetone (100 mL) was chilled in a water/ice bath. Potassium ethyl xanthate (16.0 g, Alfa Aesar) was added as a solid and after 15 minutes an additional 50 mL of acetone was added to the reaction. The reaction was stirred for a total of 1.25 hours total and then filtered through a bed of Celite. The resulting yellow solution was concentrated under reduced pressure to yield a colorless solid. The solid was dried in a vacuum oven overnight at ambient temperature to provide 14.02 g of O-ethyl-(2-amino-2-oxo-ethyl)sulfanylmethanethioate. $^1$H-NMR (acetone-d6): δ 1.39 (t, 3H), 3.91 (s, 2H), 4.63 (q, 2H), 6.6 (broad s, 1H), 7.1 (broads, 1H).

Synthesis of methyl 2,2-bis(isopropoxycarbothioylsulfanyl)acetate

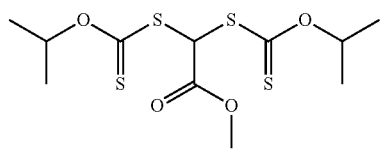 [SMILES: COC(=O)C(SC(=S)OC(C)C)SC(=S)OC(C)C]

A solution of methyl dichloroacetate (7.15 g) dissolved in 250 mL of acetone was treated with potassium isopropyl xanthate (17.5 g, TCI America, Portland, Oreg.) and the reaction mixture was stirred overnight. The reaction mixture was filtered through a plug of silica gel, rinsed with acetone, and the filtrate was concentrated to give a brown syrup. Purification by column chromatography (SiO$_2$, 18% CH$_2$Cl$_2$/hexanes to 50% CH$_2$Cl$_2$/hexanes) provided 11.5 g of methyl 2,2-bis(isopropoxycarbothioylsulfanyl)acetate as an amber colored syrup. $^1$H NMR (CDCl$_3$): δ 6.03 (s, 1H), 5.73 (m, 2H), 3.82 (s, 3H), 1.42 (d, J=6.3 Hz, 6H), 1.40 (d, J=6.3, 6H).

Synthesis of (isopropoxycarbothioylsulfanyl)methyl Octyl Ether

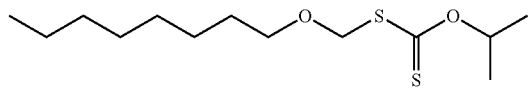 [SMILES: CCCCCCCCOCSC(=S)OC(C)C]

Isopropanol (871.1 g), in a flask equipped with a mechanical stirrer, was purged with nitrogen. Sodium metal cubes (20.25 g, Sigma-Aldrich Corporation) were cut into small pieces and added to the flask over a period of three hours. The temperature was then increased to 65° C. The sodium dissolved with evolution of hydrogen over three additional hours resulting in a clear solution. The mixture was then cooled to 35° C. using an ice bath, to provide a thick slurry. Carbon disulfide (73.80 g) was added slowly over 30 minutes to the slurry followed by stirring for an additional 30 minutes to give a yellow solution. Solvent removal under vacuum gave a yellow solid which was further dried under high vacuum (1 mm Hg) for four hours to provide 136.7 g of sodium isopropyl xanthate as a yellow powder.

A mixture of sodium isopropyl xanthate (3.90 g) and acetone (50 mL) was cooled in an ice bath. A solution of chloromethyl octyl ether (4.00 g, TCI America) was added slowly over 15 minutes. After stirring at room temperature for three hours, the solvent was removed under vacuum. Ethyl acetate (30 mL) was added and the mixture was washed with water two times. The organic phase was concentrated under vacuum and the residual oil was purified by column chromatography ($SiO_2$, 1 to 10% ethyl acetate in hexanes) to provide 5.42 g of (isopropoxycarbothioylsulfanyl)methyl octyl ether_as a yellow oil. $^1$H-NMR: δ 5.75-5.82 (m, 1H), 5.27 (s, 2H), 3.51 (t, J=6.6 Hz, 2H), 1.53-1.59 (m, 2H), 1.39 (d, J=6.3, 6H), 1.20-1.35 (m, 10H), 0.86 (t, J=7.1 Hz, 3H).

Synthesis of 2-ethoxycarbothioylsulfanylacetate, Sodium Salt

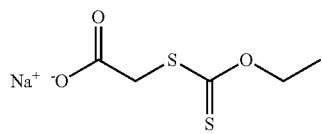

A stirred solution of sodium chloroacetate (11.65 g, Alfa Aesar) in deionized water (100 mL) was chilled in a water/ice bath. Potassium ethyl xanthate (16.0 g) was added to the solution. After 30 minutes, the water/ice bath was removed, and the reaction was stirred for 24 hours. The resulting pale-yellow solution was shown by NMR analysis to contain 2-ethoxycarbothioylsulfanylacetate, sodium salt. $^1$H NMR ($CDCl_3$): δ 4.52 (q, 2H), 3.61 (s, 2H), 1.25 (t, 3H).

Example 1

An 18 cm×23 cm section of nylon membrane substrate (nylon 6,6 membrane, single reinforced layer nylon three zone membrane, nominal pore size 1.8 micron, 0.165 mm thick, bulk density 0.415 g/cm$^3$, #080ZN from 3M Purification, Inc., Meriden, Conn.) was placed on a sheet of clear polyester film (10 mil thick). A first coating solution of benzophenone (0.5 weight percent) in acetone was prepared and approximately 10-15 mL of the coating solution was pipetted onto the top surface of the substrate. The first coating solution was allowed to soak into the substrate and then a second sheet of the polyester film was placed on top of the substrate. Excess first coating solution was removed by rolling a 2.28 kg cylindrical weight over the top of the three-layer sandwich. Ultraviolet (UV) light-initiated treatment was conducted by irradiating the sandwich using a stand (Classic Manufacturing, Inc., Oakdale, Minn.) equipped with 18 bulbs (Sylvania RG2 40 W F40/350BL/ECO, 10 bulbs positioned above, and 8 bulbs positioned below the substrate, with each bulb 1.17 meters (46 inches) long and spaced 5.1 cm (2 inches) on center). The substrate was placed on a glass plate positioned in the stand with a bulb to substrate distance of 3.5 cm. The irradiation time was 15 minutes. Following irradiation, the polyester sheets were removed and the resulting treated substrate was placed in a 1000 mL polyethylene bottle. The bottle was filled with acetone, sealed, and shaken for 30 minutes to wash off any residual benzophenone. The wash solution was decanted. The wash procedure was repeated two more times and then the substrate was air dried.

The resulting treated substrate was cut into a 9 cm×11.5 cm section and placed on a sheet of clear polyester film. A second coating solution of methyl 2-ethoxycarbothioylsulfanylacetate (2.6 weight percent) in acetone was prepared and 2.5 mL of the second coating solution was pipetted onto the top surface of the treated substrate. The second coating solution was allowed to soak into the treated substrate and then a second sheet of the polyester film was placed on top of the substrate. Excess second coating solution was removed by rolling a 2.28 kg cylindrical weight over the top of the three-layer sandwich. The sandwich was irradiated in the stand described above for 30 minutes. Following irradiation, the polyester sheets were removed. The resulting substrate functionalized with covalently attached thiocarbonylthio containing groups (—S—C(S)OCH$_2$CH$_3$) was placed in a 250 mL polyethylene bottle for washing. The bottle was filled with acetone, sealed, and shaken for 30 minutes. The wash solution was decanted. The wash procedure was repeated two more times and then the functionalized substrate was air dried. A sample of the functionalized substrate was analyzed by combustion ion chromatography and the result is reported in Table 1.

Example 2

The same procedure as described in Example 1 was followed with the exception that the treated substrate coated with the second coating solution was irradiated for 15 minutes, instead of 30 minutes. A sample of the functionalized substrate was analyzed by combustion ion chromatography and the result is reported in Table 1.

Example 3

The same procedure as described in Example 1 was followed with the exception that the treated substrate coated with the second coating solution was irradiated for 10 minutes, instead of 30 minutes. A sample of the functionalized substrate was analyzed by combustion ion chromatography and the result is reported in Table 1.

Example 4

The same procedure as described in Example 1 was followed with the exception that the treated substrate coated with the second coating solution was irradiated for 5 minutes, instead of 30 minutes. A sample of the functionalized substrate was analyzed by combustion ion chromatography and the result is reported in Table 1.

Example 5

The same procedure as described in Example 1 was followed with the exception that the first coating solution was benzophenone (1.0 weight percent) in acetone, instead of 0.5 weight percent. A sample of the functionalized substrate was analyzed by combustion ion chromatography and the result is reported in Table 2.

Example 6

The same procedure as described in Example 1 was followed with the exception that the first coating solution was benzophenone (2.5 weight percent) in acetone, instead of 0.5 weight percent. A sample of the functionalized substrate was analyzed by combustion ion chromatography and the result is reported in Table 2.

Example 7

The same procedure as described in Example 1 was followed with the exception that the first coating solution was benzophenone (5.0 weight percent) in acetone, instead of 0.5 weight percent. A sample of the functionalized substrate was analyzed by combustion ion chromatography and the result is reported in Table 2.

Example 8

The same procedure as described in Example 1 was followed with the exception that the first coating solution was benzophenone (10.0 weight percent) in acetone, instead of 0.5 weight percent. A sample of the functionalized substrate was analyzed by combustion ion chromatography and the result is reported in Table 2.

TABLE 1

Effect of Varying Irradiation Time of $2^{nd}$ Coating on the Reaction Product (Examples 1-4)

| Example Number | Irradiation Time for 2nd Coating Solution (minutes) | Conc. of —S—C(S)OCH$_2$CH$_3$ Groups in the Analytical Sample (µmol/gram) |
|---|---|---|
| 1 | 30 | 6.8 |
| 2 | 15 | 4.7 |
| 3 | 10 | 5.1 |
| 4 | 5 | 4.2 |

TABLE 2

Effect of Varying Benzophenone Concentration on the Reaction Product (Examples 5-8)

| Example Number | Conc. of Benzophenone in $1^{st}$ Coating Solution (weight %) | Conc. of —S—C(S)OCH$_2$CH$_3$ Groups in the Analytical Sample (µmol/gram) |
|---|---|---|
| 5 | 1.0 | 6.5 |
| 6 | 2.5 | 30.3 |
| 7 | 5.0 | 21.0 |
| 8 | 10.0 | 18.7 |

Example 9

An 18 cm×23 cm section of nylon membrane substrate (nylon 6,6 membrane, single reinforced layer nylon three zone membrane, nominal pore size 1.8 micron, 0.165 mm thick, bulk density 0.415 g/cm$^3$, #080ZN from 3M Purification, Inc.) was placed on a sheet of clear polyester film (10 mil thick). A first coating solution of benzophenone (0.5 weight percent) in acetone was prepared and approximately 10-15 mL of the coating solution was pipetted onto the top surface of the substrate. The first coating solution was allowed to soak into the substrate and then a second sheet of the polyester film was placed on top of the substrate. Excess first coating solution was removed by rolling a 2.28 kg cylindrical weight over the top of the three-layer sandwich. Ultraviolet (UV) light-initiated treatment was conducted by irradiating the sandwich using a stand (Classic Manufacturing, Inc.) equipped with 18 bulbs (Sylvania RG2 40 W F40/350BL/ECO, 10 bulbs positioned above, and 8 bulbs positioned below the substrate, with each bulb 1.17 meters (46 inches) long and spaced 5.1 cm (2 inches) on center). The substrate was placed on a glass plate positioned in the stand with a bulb to substrate distance of 3.5 cm. The irradiation time was 15 minutes. Following irradiation, the polyester sheets were removed, and the resulting treated substrate was placed in a 1000 mL polyethylene bottle. The bottle was filled with acetone, sealed, and shaken for 30 minutes to wash off any residual benzophenone. The wash solution was decanted. The wash procedure was repeated two more times and then the substrate was air dried.

The resulting treated substrate was cut into a 9 cm×11.5 cm section and placed on a sheet of clear polyester film. A second coating solution of dixanthogen (3.1 weight percent) in acetone was prepared and 2.5 mL of the second coating solution was pipetted onto the top surface of the treated substrate. The second coating solution was allowed to soak into the treated substrate and then a second sheet of the polyester film was placed on top of the substrate. Excess second coating solution was removed by rolling a 2.28 kg cylindrical weight over the top of the three-layer sandwich. The sandwich was irradiated in the stand described above for 30 minutes. Following irradiation, the polyester sheets were removed. The resulting substrate functionalized with covalently attached thiocarbonylthio containing groups (—S—C(S)OCH$_2$CH$_3$) was placed in a 250 mL polyethylene bottle for washing. The bottle was filled with acetone, sealed, and shaken for 30 minutes. The wash solution was decanted. The wash procedure was repeated two more times and then the functionalized substrate was air dried. A sample of the functionalized substrate was analyzed by combustion ion chromatography and the result is reported in Table 3.

Example 10

The same procedure as described in Example 9 was followed with the exception that the treated substrate coated with the second coating solution was irradiated for 15 minutes, instead of 30 minutes. A sample of the functionalized substrate was analyzed by combustion ion chromatography and the result is reported in Table 3.

Example 11

The same procedure as described in Example 9 was followed with the exception that the treated substrate coated with the second coating solution was irradiated for 10 minutes, instead of 30 minutes. A sample of the functionalized substrate was analyzed by combustion ion chromatography and the result is reported in Table 3.

Example 12

The same procedure as described in Example 9 was followed with the exception that the treated substrate coated with the second coating solution was irradiated for 5 minutes, instead of 30 minutes. A sample of the functionalized substrate was analyzed by combustion ion chromatography and the result is reported in Table 3.

TABLE 3

Effect of Varying Irradiation Time of 2$^{nd}$ Coating
on the Reaction Product (Examples 9-12)

| Example Number | Irradiation Time for 2nd Coating Solution (minutes) | Conc. of —S—C(S)OCH$_2$CH$_3$ Groups in the Analytical Sample (μmol/gram) |
|---|---|---|
| 9 | 30 | 9.5 |
| 10 | 15 | 8.1 |
| 11 | 10 | 8.1 |
| 12 | 5 | 7.1 |

Example 13

A nylon membrane substrate (nylon 6,6 membrane, single reinforced layer nylon three zone membrane, nominal pore size 1.8 μm, 0.165 mm thick, bulk density 0.415 g/cm$^3$, #080ZN from 3M Purification, Inc., 18 cm×23 cm) was placed on a sheet of clear polyester film (10 mil thick). A first coating solution of benzophenone (1.0 weight percent) in acetone was prepared and approximately 10-15 mL of the coating solution was pipetted onto the top surface of the substrate. The first coating solution was allowed to soak into the substrate and then a second sheet of the polyester film was placed on top of the substrate. Excess first coating solution was removed by rolling a 2.28 kg cylindrical weight over the top of the three-layer sandwich. Ultraviolet (UV) light-initiated treatment was conducted by irradiating the sandwich using a stand (Classic Manufacturing, Inc.) equipped with 18 bulbs (Sylvania RG2 40 W F40/350BL/ECO, 10 bulbs positioned above, and 8 bulbs positioned below the substrate, with each bulb 1.17 meters (46 inches) long and spaced 5.1 cm (2 inches) on center). The substrate was placed on a glass plate positioned in the stand with a bulb to substrate distance of 3.5 cm. The irradiation time was 15 minutes. Following irradiation, the polyester sheets were removed, and the resulting treated substrate was placed in a 1000 mL polyethylene bottle for washing. The bottle was filled with acetone, sealed, and shaken for 30 minutes to wash off any residual benzophenone. The wash solution was decanted. The wash procedure was repeated two more times and then the substrate was air dried.

The resulting treated substrate was cut into a 9 cm×11.5 cm section and placed on a sheet of clear polyester film. A second coating solution of tetraethylthiuram disulfide (available from Sigma-Aldrich Corporation, 4.0 weight percent) in acetone was prepared and 2.5 mL of the second coating solution was pipetted onto the top surface of the treated substrate. The second coating solution was allowed to soak into the treated substrate and then a second sheet of the polyester film was placed on top of the substrate. Excess second coating solution was removed by rolling a 2.28 kg cylindrical weight over the top of the three-layer sandwich. The sandwich was irradiated in the stand described above for 30 minutes. Following irradiation, the polyester sheets were removed. The resulting substrate functionalized with covalently attached thiocarbonylthio containing groups (—S—C(S)N(CH$_2$CH$_3$)$_2$ was placed in a 250 mL polyethylene bottle for washing. The bottle was filled with acetone, sealed, and shaken for 30 minutes. The wash solution was decanted. The wash procedure was repeated two more times and then the functionalized substrate was air dried. A sample of the functionalized substrate was analyzed by combustion ion chromatography and the result is reported in Table 4.

Example 14

The same procedure as described in Example 13 was followed with the exception that the first coating solution was benzophenone (2.5 weight percent) in acetone, instead of 1.0 weight percent. A sample of the functionalized substrate was analyzed by combustion ion chromatography and the result is reported in Table 4.

Example 15

The same procedure as described in Example 13 was followed with the exception that the first coating solution was benzophenone (5.0 weight percent) in acetone, instead of 1.0 weight percent. A sample of the functionalized substrate was analyzed by combustion ion chromatography and the result is reported in Table 4.

Example 16

The same procedure as described in Example 13 was followed with the exception that the first coating solution was benzophenone (10.0 weight percent) in acetone, instead of 1.0 weight percent. A sample of the functionalized substrate was analyzed by combustion ion chromatography and the result is reported in Table 4.

TABLE 4

Effect of Varying Benzophenone Concentration
on the Reaction Product (Examples 13-16)

| Example Number | Conc. of Benzophenone in 1st Coating Solution (weight %) | Conc. of —S—C(S)N(CH$_2$CH$_3$)$_2$ Groups in the Analytical Sample (μmol/gram) |
|---|---|---|
| 13 | 1.0 | 6.1 |
| 14 | 2.5 | 8.7 |
| 15 | 5.0 | 8.1 |
| 16 | 10.0 | 9.2 |

Example 17

A 9 cm×11.5 cm section of nylon membrane substrate (nylon 6,6 membrane, single reinforced layer nylon three zone membrane, nominal pore size 1.8 micron, 0.165 mm thick, bulk density 0.415 g/cm$^3$, #080ZN from 3M Purification, Inc.) was placed on a sheet of clear polyester film (10 mil thick). A coating solution containing benzophenone (0.5 weight percent) and methyl 2-ethoxycarbothioylsulfanylacetate (2.6 weight percent) in acetone was prepared. Approximately 2.5-3 mL of the coating solution was pipetted onto the top surface of the substrate. The coating solution was allowed to soak into the substrate and then a second sheet of the polyester film was placed on top of the substrate. Excess coating solution was removed by rolling a 2.28 kg cylindrical weight over the top of the three-layer sandwich. Ultraviolet (UV) light-initiated functionalization was conducted by irradiating the sandwich using a stand (Classic Manufacturing, Inc.) equipped with 18 bulbs (Sylvania RG2 40 W F40/350BL/ECO, 10 bulbs positioned above, and 8 bulbs positioned below the substrate, with each bulb 1.17 meters (46 inches) long and spaced 5.1 cm (2 inches) on center). The substrate was placed on a glass plate positioned in the stand with a bulb to substrate distance of 3.5 cm. The irradiation time was 30 minutes. Following irradiation, the polyester sheets were removed.

The resulting substrate functionalized with covalently attached thiocarbonylthio containing groups (—S—C(S)OCH$_2$CH$_3$) was placed in a 250 mL polyethylene bottle for washing. The bottle was filled with acetone, sealed, and shaken for 30 minutes. The wash solution was decanted. The wash procedure was repeated two more times and then the functionalized substrate was air dried. A sample of the functionalized substrate was analyzed by combustion ion chromatography and the result is reported in Table 5.

Example 18

The same procedure as described in Example 17 was followed with the exception that the irradiation time was 15 minutes, instead of 30 minutes. A sample of the functionalized substrate was analyzed by combustion ion chromatography and the result is reported in Table 5.

Example 19

The same procedure as described in Example 17 was followed with the exception that the irradiation time was 10 minutes, instead of 30 minutes. A sample of the functionalized substrate was analyzed by combustion ion chromatography and the result is reported in Table 5.

Example 20

The same procedure as described in Example 17 was followed with the exception that the irradiation time was 5 minutes, instead of 30 minutes. A sample of the functionalized substrate was analyzed by combustion ion chromatography and the result is reported in Table 5.

Example 21

The same procedure as described in Example 17 was followed with the exception that the coating solution contained benzophenone (1.0 weight percent) and methyl 2-ethoxycarbothioylsulfanylacetate (2.5 weight percent) in acetone. A sample of the functionalized substrate was analyzed by combustion ion chromatography and the result is reported in Table 6.

Example 22

The same procedure as described in Example 17 was followed with the exception that the coating solution contained benzophenone (1.0 weight percent) and methyl 2-ethoxycarbothioylsulfanylacetate (7.5 weight percent) in acetone. A sample of the functionalized substrate was analyzed by combustion ion chromatography and the result is reported in Table 6.

Example 23

The same procedure as described in Example 17 was followed with the exception that the coating solution contained benzophenone (3.0 weight percent) and methyl 2-ethoxycarbothioylsulfanylacetate (5.0 weight percent) in acetone. A sample of the functionalized substrate was analyzed by combustion ion chromatography and the result is reported in Table 6.

Example 24

The same procedure as described in Example 17 was followed with the exception that the coating solution contained benzophenone (3.0 weight percent) and methyl 2-ethoxycarbothioylsulfanylacetate (5.0 weight percent) in acetone. A sample of the functionalized substrate was analyzed by combustion ion chromatography and the result is reported in Table 6.

Example 25

The same procedure as described in Example 17 was followed with the exception that the coating solution contained benzophenone (5.0 weight percent) and methyl 2-ethoxycarbothioylsulfanylacetate (2.5 weight percent) in acetone. A sample of the functionalized substrate was analyzed by combustion ion chromatography and the result is reported in Table 6.

Example 26

The same procedure as described in Example 17 was followed with the exception that the coating solution contained benzophenone (5.0 weight percent) and methyl 2-ethoxycarbothioylsulfanylacetate (7.5 weight percent) in acetone. A sample of the functionalized substrate was analyzed by combustion ion chromatography and the result is reported in Table 6.

TABLE 5

Effect of Varying Irradiation Time on the Reaction Product (Examples 17-20)

| Example Number | Irradiation Time for the Coating Solution (minutes) | Conc. of —S—C(S)OCH$_2$CH$_3$ Groups in the Analytical Sample (μmol/gram) |
| --- | --- | --- |
| 17 | 30 | 8.4 |
| 18 | 15 | 5.9 |
| 19 | 10 | 5.1 |
| 20 | 5 | 4.3 |

TABLE 6

Effect of Varying Benzophenone and Methyl 2-ethoxycarbothioylsulfanylacetate Concentrations on the Reaction Product (Examples 21-26)

| Example Number | Conc. of Benzophenone in the Coating Solution (weight %) | Conc. of methyl 2-ethoxycarbothioylsulfanylacetate in the Coating Solution (weight %) | Conc. of —S—C(S)OCH$_2$CH$_3$ Groups in the Analytical Sample (μmol/gram) |
| --- | --- | --- | --- |
| 21 | 1.0 | 2.5 | 6.0 |
| 22 | 1.0 | 7.5 | 5.1 |
| 23 | 3.0 | 5.0 | 7.9 |
| 24 | 3.0 | 5.0 | 6.5 |

TABLE 6-continued

Effect of Varying Benzophenone and Methyl 2-ethoxycarbothioylsulfanylacetate
Concentrations on the Reaction Product (Examples 21-26)

| Example Number | Conc. of Benzophenone in the Coating Solution (weight %) | Conc. of methyl 2-ethoxycarbothioylsulfanylacetate in the Coating Solution (weight %) | Conc. of —S—C(S)OCH$_2$CH$_3$ Groups in the Analytical Sample (µmol/gram) |
|---|---|---|---|
| 25 | 5.0 | 2.5 | 8.6 |
| 26 | 5.0 | 7.5 | 5.3 |

Example 27

An 18 cm×23 cm section of nylon membrane substrate (nylon 6,6 membrane, single reinforced layer nylon three zone membrane, nominal pore size 1.8 micron, 0.165 mm thick, bulk density 0.415 g/cm$^3$, #08ZN from 3M Purification, Inc.) was placed on a sheet of clear polyester film (10 mil thick). A coating solution containing benzophenone (1.0 weight percent) and dixanthogen (3.1 weight percent) in acetone was prepared. Approximately 10-15 mL of the coating solution was pipetted onto the top surface of the substrate. The coating solution was allowed to soak into the substrate and then a second sheet of the polyester film was placed on top of the substrate. Excess coating solution was removed by rolling a 2.28 kg cylindrical weight over the top of the three-layer sandwich. Ultraviolet (UV) light-initiated functionalization was conducted by irradiating the sandwich using a stand (Classic Manufacturing, Inc.) equipped with 18 bulbs (Sylvania RG2 40 W F40/350BL/ECO, 10 bulbs positioned above, and 8 bulbs positioned below the substrate, with each bulb 1.17 meters (46 inches) long and spaced 5.1 cm (2 inches) on center). The substrate was placed on a glass plate positioned in the stand with a bulb to substrate distance of 3.5 cm. The irradiation time was 30 minutes. Following irradiation, the polyester sheets were removed.

The resulting substrate functionalized with covalently attached thiocarbonylthio containing groups (—S—C(S)OCH$_2$CH$_3$) was placed in a 1000 mL polyethylene bottle for washing. The bottle was filled with acetone, sealed, and shaken for 30 minutes. The wash solution was decanted. The wash procedure was repeated two more times and then the functionalized substrate was air dried. A sample of the functionalized substrate was analyzed by combustion ion chromatography and the result is reported in Table 7.

Example 28

The same procedure as described in Example 27 was followed with the exception that the coating solution contained benzophenone (1.0 weight percent) and dixanthogen (9.3 weight percent) in acetone. A sample of the functionalized substrate was analyzed by combustion ion chromatography and the result is reported in Table 7.

Example 29

The same procedure as described in Example 27 was followed with the exception that the coating solution contained benzophenone (3.0 weight percent) and dixanthogen (6.2 weight percent) in acetone. A sample of the functionalized substrate was analyzed by combustion ion chromatography and the result is reported in Table 7.

Example 30

The same procedure as described in Example 27 was followed with the exception that the coating solution contained benzophenone (3.0 weight percent) and dixanthogen (6.2 weight percent) in acetone. A sample of the functionalized substrate was analyzed by combustion ion chromatography and the result is reported in Table 7.

Example 31

The same procedure as described in Example 27 was followed with the exception that the coating solution contained benzophenone (5.0 weight percent) and dixanthogen (3.1 weight percent) in acetone. A sample of the functionalized substrate was analyzed by combustion ion chromatography and the result is reported in Table 7.

Example 32

The same procedure as described in Example 27 was followed with the exception that the coating solution contained benzophenone (5.0 weight percent) and dixanthogen (9.3 weight percent) in acetone. A sample of the functionalized substrate was analyzed by combustion ion chromatography and the result is reported in Table 7.

TABLE 7

Effect of Varying Benzophenone and Dixanthogen Concentrations on the Reaction Product (Examples 27-32)

| Example Number | Conc. of Benzophenone in the Coating Solution (weight %) | Conc. of Dixanthogen in the Coating Solution (weight %) | Conc. of —S—C(S)OCH$_2$CH$_3$ Groups in the Analytical Sample (µmol/gram) |
|---|---|---|---|
| 27 | 1.0 | 3.1 | 7.9 |
| 28 | 1.0 | 9.3 | 7.6 |
| 29 | 3.0 | 6.2 | 9.8 |
| 30 | 3.0 | 6.2 | 8.7 |
| 31 | 5.0 | 3.1 | 10.6 |
| 32 | 5.0 | 9.3 | 8.8 |

Example 33

An 9 cm×11.5 cm section of nylon membrane substrate (nylon 6,6 membrane, single reinforced layer nylon three zone membrane, nominal pore size 1.8 micron, 0.165 mm thick, bulk density 0.415 g/cm$^3$, #08ZN from 3M Purification, Inc.) was placed on a sheet of clear polyester film (10 mil thick). A coating solution containing benzophenone (0.5 weight percent) and O-ethyl-(2-amino-2-oxo-ethyl)sulfanyl-methanethioate (2.1 weight percent) in acetone was prepared. Approximately 2.5-3 mL of the coating solution was pipetted onto the top surface of the substrate. The coating solution was allowed to soak into the substrate and then a second sheet of the polyester film was placed on top of the substrate. Excess coating solution was removed by rolling a 2.28 kg cylindrical weight over the top of the three-layer sandwich. Ultraviolet (UV) light-initiated functionalization was conducted by irradiating the sandwich using a stand (Classic Manufacturing, Inc.) equipped with 18 bulbs (Sylvania RG2 40 W F40/350BL/ECO, 10 bulbs positioned above, and 8 bulbs positioned below the substrate, with each bulb 1.17 meters (46 inches) long and spaced 5.1 cm (2 inches) on center). The substrate was placed on a glass plate positioned in the stand with a bulb to substrate distance of 3.5 cm. The irradiation time was 60 minutes. Following irradiation, the polyester sheets were removed.

The resulting substrate functionalized with covalently attached thiocarbonylthio containing groups (—S—C(S)OCH$_2$CH$_3$) was placed in a 250 mL polyethylene bottle for washing. The bottle was filled with acetone, sealed, and shaken for 30 minutes. The wash solution was decanted. The wash procedure was repeated two more times and then the functionalized substrate was air dried. A sample of the functionalized substrate was analyzed by combustion ion chromatography and the result is reported in Table 8.

Example 34

The same procedure as described in Example 33 was followed with the exception that the irradiation time was 30 minutes, instead of 60 minutes. A sample of the functionalized substrate was analyzed by combustion ion chromatography and the result is reported in Table 8.

Example 35

The same procedure as described in Example 33 was followed with the exception that the irradiation time was 15 minutes, instead of 60 minutes. A sample of the functionalized substrate was analyzed by combustion ion chromatography and the result is reported in Table 8.

Example 36

The same procedure as described in Example 33 was followed with the exception that the irradiation time was 10 minutes, instead of 60 minutes. A sample of the functionalized substrate was analyzed by combustion ion chromatography and the result is reported in Table 8.

Example 37

The same procedure as described in Example 33 was followed with the exception that the irradiation time was 5 minutes, instead of 60 minutes. A sample of the functionalized substrate was analyzed by combustion ion chromatography and the result is reported in Table 8.

TABLE 8

Effect of Irradiation Time on the Reaction Product (Examples 33-37)

| Example Number | Irradiation Time (minutes) | Conc. of —S—C(S)OCH$_2$CH$_3$ Groups in the Analytical Sample (µmol/gram) |
|---|---|---|
| 33 | 60 | 8.0 |
| 34 | 30 | 9.4 |
| 35 | 15 | 10.3 |
| 36 | 10 | 5.8 |
| 37 | 5 | 4.9 |

Example 38

An 9 cm×11.5 cm section of nylon membrane substrate (nylon 6,6 membrane, single reinforced layer nylon three zone membrane, nominal pore size 1.8 micron, 0.165 mm thick, bulk density 0.415 g/cm$^3$, #080ZN from 3M Purification, Inc.) was placed on a sheet of clear polyester film (10 mil thick). A coating solution containing benzophenone (0.5 weight percent) and methyl 2-ethoxycarbothioylsulfanyllactate (2.6 weight percent) in heptane was prepared. Approximately 2.5-3 mL of the coating solution was pipetted onto the top surface of the substrate. The coating solution was allowed to soak into the substrate and then a second sheet of the polyester film was placed on top of the substrate. Excess coating solution was removed by rolling a 2.28 kg cylindrical weight over the top of the three-layer sandwich. Ultraviolet (UV) light-initiated functionalization was conducted by irradiating the sandwich using a stand (Classic Manufacturing, Inc.) equipped with 18 bulbs (Sylvania RG2 40 W F40/350BL/ECO, 10 bulbs positioned above, and 8 bulbs positioned below the substrate, with each bulb 1.17 meters (46 inches) long and spaced 5.1 cm (2 inches) on center). The substrate was placed on a glass plate positioned in the stand with a bulb to substrate distance of 3.5 cm. The irradiation time was 60 minutes. Following irradiation, the polyester sheets were removed. The resulting substrate functionalized with covalently attached thiocarbonylthio containing groups (—S—C(S)OCH$_2$CH$_3$) was placed in a 250 mL polyethylene bottle for washing. The bottle was filled with acetone, sealed, and shaken for 30 minutes. The wash solution was decanted. The wash procedure was repeated two more times and then the functionalized substrate was air dried. A sample of the functionalized substrate was analyzed by combustion ion chromatography and the result is reported in Table 9.

Example 39

The same procedure as described in Example 38 was followed with the exception that the irradiation time was 30 minutes, instead of 60 minutes. A sample of the functionalized substrate was analyzed by combustion ion chromatography and the result is reported in Table 9.

Example 40

The same procedure as described in Example 38 was followed with the exception that the irradiation time was 15 minutes, instead of 60 minutes. A sample of the functionalized substrate was analyzed by combustion ion chromatography and the result is reported in Table 9.

Example 41

The same procedure as described in Example 38 was followed with the exception that the irradiation time was 10 minutes, instead of 60 minutes. A sample of the functionalized substrate was analyzed by combustion ion chromatography and the result is reported in Table 9.

Example 42

The same procedure as described in Example 38 was followed with the exception that the irradiation time was 5 minutes, instead of 60 minutes. A sample of the functionalized substrate was analyzed by combustion ion chromatography and the result is reported in Table 9.

TABLE 9

Effect of Irradiation Time on the Reaction Product (Examples 38-42)

| Example Number | Irradiation Time (minutes) | Conc. of —S—C(S)OCH$_2$CH$_3$ Groups in the Analytical Sample (µmol/gram) |
|---|---|---|
| 38 | 60 | 20.7 |
| 39 | 30 | 17.3 |
| 40 | 15 | 14.8 |
| 41 | 10 | 9.5 |
| 42 | 5 | 8.1 |

Example 43

Six samples (each 9 cm×11.5 cm) of a nylon membrane substrate (nylon 6,6 membrane, single reinforced layer nylon three zone membrane, nominal pore size 1.8 micron, 0.165 mm thick, bulk density 0.415 g/cm$^3$, #080ZN from 3M Purification, Inc.) were individually placed in separate polyethylene bags with zip-lock type closures. Six vials were prepared with each vial containing a 5 mL solution of methyl 2-ethoxycarbothioylsulfanylacetate (2.6 weight percent) in heptane that was sparged by bubbling nitrogen through the solution for 2 minutes. The opened bags and vials were placed in a glove box under a nitrogen atmosphere for 15 minutes. Each bag was sealed, removed from the glove box, and then exposed to e-beam irradiation at a selected dose of either 0.5 Mrad, 1.0 Mrad, 3.0 Mrad, 6.0 Mrad, 9.0 Mrad, or 0.0 Mrad (control sample). Each bag was returned to the glove box and maintained for 5 minutes. Next, each bag was opened and 5 mL of the methyl 2-ethoxycarbothioylsulfanylacetate solution was added to the substrate. A roller was used to facilitate saturation of the substrate with the solution. The bags were resealed and maintained in the nitrogen atmosphere of the glove box for at least 15 additional minutes. Each substrate was subsequently removed from the bag and individually placed into one of six polyethylene bottles (250 mL). Each bottle was filled with heptane, sealed, and placed on a horizontal roller for 30 minutes in order to wash residual methyl 2-ethoxycarbothioylsulfanylacetate from the substrate. The wash solvent was decanted. The wash procedure was repeated two more times and then each functionalized substrate was air dried. A sample of each functionalized substrate was analyzed by x-ray fluorescence spectroscopy and the results are reported in Table 10.

TABLE 10

Effect of E-Beam Irradiation Dose on the Reaction Product (Example 43)

| E-Beam Irradiation (Mrad) | Conc. of —S—C(S)OCH$_2$CH$_3$ Groups in the Analytical Sample (µmol/gram) |
|---|---|
| 0.5 | 10.4 |
| 1.0 | 12.1 |
| 3.0 | 19.0 |
| 6.0 | 18.9 |
| 9.0 | 23.1 |
| 0.0 (control) | <0.2* |

*The control sample measured <10 ppm sulfur

Example 44

A 12.5 cm×12.5 cm section of polyethersulfone (PES) membrane substrate (0.8 micron nominal pore size, 0.11 mm thick, Zetapore 8F PH from 3M Purification, Inc.) was placed on a sheet of clear polyester film (10 mil thick). A coating solution containing methyl 2-ethoxycarbothioylsulfanylacetate (2.5 weight percent) in heptane was prepared. Approximately 5-6 mL of the coating solution was pipetted onto the top surface of the substrate. The coating solution was allowed to soak into the substrate and then a second sheet of the polyester film was placed on top of the substrate. Excess coating solution was removed by rolling a 2.28 kg cylindrical weight over the top of the three-layer sandwich. Ultraviolet (UV) light-initiated functionalization was conducted by irradiating the sandwich using a stand (Classic Manufacturing, Inc.) equipped with 18 bulbs (Sylvania RG2 40 W F40/350BL/ECO, 10 bulbs positioned above, and 8 bulbs positioned below the substrate, with each bulb 1.17 meters (46 inches) long and spaced 5.1 cm (2 inches) on center). The substrate was placed on a glass plate positioned in the stand with a bulb to substrate distance of 3.5 cm. The irradiation time was 60 minutes. Following irradiation, the polyester sheets were removed. The resulting substrate functionalized with covalently attached thiocarbonylthio containing groups (—S—C(S)OCH$_2$CH$_3$) was placed in a 1000 mL polyethylene bottle for washing. The bottle was filled with heptane, sealed, and shaken for 30 minutes. The wash solution was decanted. The wash procedure was repeated two more times and then the functionalized substrate was air dried. A 10 mm diameter disk was punched from the functionalized membrane, dissolved in DMSO-d6, and subjected to NMR analysis. The NMR spectrum displayed, in addition to the aromatic hydrogen absorptions attributed to the polyethersulfone, small signals at δ 1.32 (triplet) and 4.59 (quartet) attributable to the attached ethoxythiocarbonylthio groups (EtO—C(S)—S—).

Example 45

The same procedure as described in Example 44 was followed with the exception that the coating solution contained dixanthogen (3.0 weight percent) in heptane. The resulting substrate was functionalized with covalently attached ethoxythiocarbonylthio groups (EtO—C(S)—S—).

Example 46

The same procedure as described in Example 44 was followed with the exception that the coating solution contained tetraethylthiuram disulfide (3.1 weight percent) in toluene and toluene was used as the wash solvent following functionalization. Following drying, a 10 mm diameter disk was punched from the functionalized membrane, dissolved in DMSO-d6, and subjected to NMR analysis. The NMR spectrum displayed, in addition to the aromatic hydrogen absorptions attributed to the polyethersulfone, small signals at δ 1.17 (triplet), 1.39 (triplet), and 3.96 (multiplet) attributable to the attached N,N-diethylthiocarbonylthio groups ($Et_2N-C(S)-S-$).

Example 47

The same procedure as described in Example 38 was followed with the following exceptions: the section of nylon membrane substrate was 9 cm×11.5 cm; that the coating solution contained benzophenone (0.5 weight percent) and (isopropoxycarbothioylsulfanyl)methyl octyl ether (4.0 weight percent) in heptane; and approximately 2.5-3 mL of the coating solution was pipetted onto the top surface of the substrate. The resulting substrate was functionalized with covalently attached $-S-C(S)OCH(CH_3)_2$. A sample of the functionalized substrate was analyzed by X-ray fluorescence and the result is reported in Table 11.

Example 48

The same procedure as described in Example 47 was followed with the exception that the irradiation time was 30 minutes, instead of 60 minutes. A sample of the functionalized substrate was analyzed by X-ray fluorescence and the result is reported in Table 11.

Example 49

The same procedure as described in Example 47 was followed with the exception that the irradiation time was 15 minutes, instead of 60 minutes. A sample of the functionalized substrate was analyzed by X-ray fluorescence and the result is reported in Table 11.

Example 50

The same procedure as described in Example 47 was followed with the exception that the irradiation time was 10 minutes, instead of 60 minutes. A sample of the functionalized substrate was analyzed by X-ray fluorescence and the result is reported in Table 11.

Example 51

The same procedure as described in Example 47 was followed with the exception that the irradiation time was 5 minutes, instead of 60 minutes. A sample of the functionalized substrate was analyzed by X-ray fluorescence and the result is reported in Table 11.

TABLE 11

Effect of Irradiation Time on the Reaction Product (Examples 47-51)

| Example Number | Irradiation Time (minutes) | Conc. of $-S-C(S)OCH(CH_3)_2$ Groups in the Analytical Sample (μmol/gram) |
|---|---|---|
| 47 | 60 | 4.2 |
| 48 | 30 | 2.8 |
| 49 | 15 | 2.4 |
| 50 | 10 | 1.9 |
| 51 | 5 | 1.6 |

Examples 52-55

The same procedures as described in Examples 48-51 were followed with the exception that the coating solution contained benzophenone (0.5 weight percent) and methyl 2,2-bis(isopropoxycarbothioylsulfanyl)acetate (5.0 weight percent) in heptane. Samples of the functionalized substrates were analyzed by X-ray fluorescence and the result is reported in Table 12.

TABLE 12

Effect of Irradiation Time on the Reaction Product (Examples 52-55)

| Example Number | Irradiation Time (minutes) | Conc. Of $-S-(CS)OCH(CH_3)_2$ in the Analytical Sample (μmol/gram) |
|---|---|---|
| 52 | 30 | 5.4 |
| 53 | 15 | 4.4 |
| 54 | 10 | 4.2 |
| 55 | 5 | 3.6 |

Example 56

A 17 cm×17 cm sheet of polypropylene blown microfiber nonwoven substrate (prepared by a melt-blown process with an effective fiber diameter (EFD) of 4.3 microns, basis weight of 90 grams per square meter, and solidity of 10%) was placed in a polyethylene bag with a zip-lock type closure. A vial was prepared containing a 15 mL solution of methyl 2-ethoxycarbothioylsulfanylacetate (2.5 weight percent) in heptane that was sparged by bubbling nitrogen through the solution for 2 minutes. The opened bag and vial were placed in a glove box under a nitrogen atmosphere for 15 minutes. The bag was sealed, removed from the glove box, and then exposed to e-beam irradiation at a selected dose of 5.0 Mrad. The bag was returned to the glove box and maintained for 5 minutes. Next, the bag was opened and 15 mL of the methyl 2-ethoxycarbothioylsulfanylacetate solution was added to the substrate. A roller was used to facilitate saturation of the substrate with the solution. The bag was resealed and maintained in the nitrogen atmosphere of the glove box for at least 30 additional minutes. The substrate was subsequently removed from the bag and placed into a polyethylene bottle (250 mL). The bottle was filled with heptane, sealed, and placed on a horizontal roller for 30 minutes in order to wash residual methyl 2-ethoxycarbothioylsulfanylacetate from the substrate. The wash solvent was decanted. The wash procedure was repeated two more times and then the functionalized substrate was air dried. The sample were analyzed by X-ray fluorescence spectroscopy and the result is reported in Table 13. Analysis of an untreated sheet of the polypropylene blown microfiber nonwoven substrate served as a control and showed that the sulfur content of the starting substrate was zero.

TABLE 13

Effect of E-Beam Irradiation Dose on the Reaction Product (Example 56)

| E-Beam Irradiation (Mrad) | Conc. of —S—C(S)OCH$_2$CH$_3$ Groups in the Analytical Sample (μmol/gram) |
|---|---|
| 5.0 | 4.3 |
| 0.0 (control) | 0.0 |

Example 57

A functionalized substrate was prepared as described in Example 18. A coating solution was prepared containing isooctylacrylate (1 M) in ethyl acetate solvent. Approximately 5-6 mL of the coating solution was pipetted onto the top surface of the functionalized substrate. The coating solution was allowed to soak into the substrate and then a second sheet of the polyester film was placed on top of the substrate. Excess coating solution was removed by rolling a 2.28 kg cylindrical weight over the top of the three-layer sandwich (polyester film-functionalized substrate-polyester film). Ultraviolet (UV) light-initiated grafting was conducted by irradiating the sandwich using a stand (Classic Manufacturing, Inc.) equipped with 18 bulbs (Sylvania RG2 40 W F40/350BL/ECO, 10 bulbs positioned above, and 8 bulbs positioned below the substrate, with each bulb 1.17 meters (46 inches) long and spaced 5.1 cm (2 inches) on center). The substrate was placed on a glass plate positioned in the stand with a bulb to substrate distance of 3.5 cm. The irradiation time was 30 minutes. Following irradiation, the polyester sheets were removed. The resulting grafted substrate was placed in a 250 mL polyethylene bottle for washing. The bottle was filled with acetone, sealed, and shaken for 30 minutes. The wash solution was decanted. The wash procedure was repeated two more times and then the grafted substrate was air dried. The grafted substrate exhibited a mass gain of 1.0%. The grafted substrate was very similar in appearance and to the touch to that of the original, untreated membrane substrate. When a drop of deionized water was placed on the grafted substrate, the water beaded up, indicating that the membrane surface was rendered hydrophobic by the grafted isooctylacrylate. By contrast, water readily wicked into and wetted the surface of the original, untreated membrane substrate.

What is claimed is:

1. A method of making a first article comprising a functionalized substrate, the method comprising:
    providing a solid polymeric substrate;
    generating free radicals on a surface of the solid polymeric substrate to form a treated substrate; and
    reacting the free radicals of the treated substrate with a fluid comprising a thiocarbonylthio-containing compound to covalently bond a plurality of thiocarbonylthio-containing groups directly to carbon atoms in a polymeric backbone of the solid polymeric substrate and forming the functionalized substrate.

2. The method of claim 1, wherein generating free radicals on the surface of the solid polymeric substrate comprises:
    applying a coating layer comprising a type II photoinitiator to the surface of the solid polymeric substrate; and
    irradiating the coating layer with ultraviolet radiation to abstract hydrogen atoms from the solid polymeric substrate to form the treated substrate.

3. The method of claim 2, wherein the thiocarbonylthio-containing compound is present when generating free radicals on the surface of the solid polymeric substrate.

4. The method of claim 1, wherein generating free radicals on the surface of the solid polymeric substrate to form the treated substrate comprises exposing the solid polymeric substrate to electron beam radiation, gamma radiation, or to a plasma.

5. The method of claim 4, wherein the thiocarbonylthio-containing compound is absent when generating free radicals on the surface of the solid polymeric substrate.

6. A first article comprising a functionalized substrate, the functionalized substrate comprising a reaction product of a reaction mixture comprising:
    a) a treated substrate comprising a solid polymeric substrate having free radicals; and
    b) a fluid comprising a thiocarbonylthio-containing compound, wherein the functionalized substrate has a plurality of thiocarbonylthio-containing groups directly and covalently attached to carbon atoms in a polymeric backbone of the solid polymeric substrate.

7. The article of claim 6, wherein the solid polymeric substrate is free of thiocarbonylthio-containing groups.

8. The article of claim 6, wherein the reaction mixture is free of monomers.

9. The article of claim 6, wherein the solid polymeric substrate is porous.

10. The article of claim 6, wherein the thiocarbonylthio-containing groups are of formula —S—C(=S)—R$^1$ wherein
    group R$^1$ is an alkoxy, aralkyloxy, alkenyloxy or —N(R$^4$)$_2$; and
    each R$^4$ is an alkyl or two adjacent R$^4$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic.

11. The article of claim 10, wherein R$^1$ is an alkoxy.

12. The article of claim 10, wherein R$^1$ is of formula —N(R$^4$)$_2$ and R$^4$ is an alkyl.

13. A method of making a second article having attached polymeric chains, the method comprising:
    providing a solid polymeric substrate;
    generating free radicals on a surface of the solid polymeric substrate to form a treated substrate;
    reacting the free radicals of the treated substrate with a fluid comprising a thiocarbonylthio-containing compound to covalently bond a plurality of thiocarbonylthio-containing groups directly and covalently to the solid polymeric substrate and forming a functionalized substrate;
    preparing a reaction mixture by contacting the functionalized substrate with a monomer composition comprising radically polymerizable monomers; and
    exposing the reaction mixture to actinic radiation and forming a polymeric chain directly and covalently attached to carbon atoms in a polymeric backbone of the solid polymeric substrate, the polymeric chains being a polymerized product of the radically polymerizable monomer.

14. The method of claim 13, wherein at least some of the polymeric chains are terminated with a thiol group or a thiocarbonylthio-containing group.

15. An article comprising a solid polymeric substrate and polymeric chains attached directly and covalently to carbon atoms in a polymeric backbone of the solid polymeric substrate, wherein the polymeric chains comprise a polymerized product of a radically polymerizable monomer composition and wherein at least some of the polymeric chains are terminated by a thiol or a thiocarbonylthio-containing group.

16. The method of claim 1, wherein the thiocarbonylthio-containing groups are of formula —S—C(=S)—$R^1$ wherein group $R^1$ is an alkoxy, aralkyloxy, alkenyloxy or —N($R^4$)$_2$; and each $R^4$ is an alkyl or two adjacent $R^4$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic.

* * * * *